(12) United States Patent
Jun

(10) Patent No.: US 9,194,460 B2
(45) Date of Patent: Nov. 24, 2015

(54) APPARATUS FOR AUTOMATICALLY EQUALIZING TENSIONS IN ELEVATOR WIRE ROPES

(76) Inventor: Beong Soo Jun, Gimhae-si (KR)

(*) Notice: Subject to any disclaimer, the term of this patent is extended or adjusted under 35 U.S.C. 154(b) by 397 days.

(21) Appl. No.: 13/810,419

(22) PCT Filed: Jul. 14, 2011

(86) PCT No.: PCT/KR2011/005193
§ 371 (c)(1),
(2), (4) Date: Jan. 16, 2013

(87) PCT Pub. No.: WO2012/008778
PCT Pub. Date: Jan. 19, 2012

(65) Prior Publication Data
US 2013/0112508 A1 May 9, 2013

(30) Foreign Application Priority Data
Jul. 15, 2010 (KR) .................. 10-2010-0068489

(51) Int. Cl.
*B66B 7/10* (2006.01)
*F16H 1/36* (2006.01)

(52) U.S. Cl.
CPC ... *F16H 1/36* (2013.01); *B66B 7/10* (2013.01)

(58) Field of Classification Search
CPC .............. B66B 7/10; F16H 37/00; F16H 1/36
USPC ........... 187/412; 474/148, 152; 475/338, 330, 475/331
See application file for complete search history.

(56) References Cited

U.S. PATENT DOCUMENTS

| | | | |
|---|---|---|---|
| 616,744 A * | 12/1898 | Symonds ............... | 475/338 |
| 1,442,795 A * | 1/1923 | Cook et al. ............ | 475/338 |
| 3,265,362 A * | 8/1966 | Moody .................. | 254/343 |
| 3,361,010 A * | 1/1968 | Miller .................... | 74/810.2 |
| 3,402,622 A * | 9/1968 | Matut Archanco ..... | 475/338 |
| 4,446,757 A * | 5/1984 | La Fever ............... | 475/12 |
| 4,862,009 A * | 8/1989 | King ..................... | 290/22 |
| 5,800,302 A * | 9/1998 | Werre .................... | 475/1 |
| 6,009,979 A * | 1/2000 | Kim ...................... | 187/239 |
| 6,422,971 B1 * | 7/2002 | Katou et al. ........... | 475/331 |

(Continued)

FOREIGN PATENT DOCUMENTS

| JP | 2006-513113 A | 4/2006 |
|---|---|---|
| KR | 10-2007-0065968 A | 6/2007 |
| KR | 10-2008-0012082 A | 2/2008 |

*Primary Examiner* — Sang Kim
*Assistant Examiner* — Michael Riegelman
(74) *Attorney, Agent, or Firm* — JaeYoun Kim; Novick, Kim & Lee, PLLC

(57) ABSTRACT

Disclosed is an apparatus for automatically equalizing tensions of elevator wire ropes by which an unbalance of tensions of elevator wire ropes can be immediately solved to automatically equalize the tensions in real time when lengths of the wire ropes become different, improving safety, durability, and reliability. The apparatus according to the present invention includes a body (100) having an accommodation space therein, a tension adjusting unit connected to elevator wire ropes (R1~R4) and installed within the body (100), a main shaft (200) passing through the tension adjusting unit and rotatably coupled to an inner side of the body (100) horizontally; and first to fourth guide rollers (B1~B4) rotatably coupled to the body (100) such that the elevator wire ropes (R1~R4) connected to the tension adjusting unit contact the first to fourth guide rollers (B1~B4) at outer sides thereof.

9 Claims, 21 Drawing Sheets

(56) References Cited

U.S. PATENT DOCUMENTS

| | | | |
|---|---|---|---|
| 2004/0154876 A1* | 8/2004 | Choi | 187/412 |
| 2011/0053729 A1* | 3/2011 | Parsons et al. | 475/297 |
| 2012/0055743 A1* | 3/2012 | Jun | 187/412 |
| 2013/0056313 A1* | 3/2013 | Cao et al. | 187/390 |
| 2013/0112508 A1* | 5/2013 | Jun | 187/412 |

* cited by examiner

APPARATUS FOR AUTOMATICALLY EQUALIZING TENSIONS IN ELEVATOR WIRE ROPES

TECHNICAL FIELD

The present invention relates to an apparatus for automatically equalizing tensions of elevator wire ropes. More particularly, the present invention relates to an apparatus for automatically equalizing tensions of elevator wire ropes, which can immediately correct the changed lengths of the wire ropes when lengths of wire ropes become different as the wire ropes are deformed by reciprocal mechanical movements, such as bending or expansion, of the wire ropes suspended on pulleys.

BACKGROUND ART

In general, tensions of a plurality of independent suspended wire ropes become unbalanced while an elevator is reciprocated by the wire ropes.

The unbalance of the tensions is periodically managed, but since the tensions are changed in real time according to a temperature of the field where the elevator is installed and the number of operations of the elevator even if the tensions are periodically checked and managed, the unbalance remains until the next check.

The unbalance of the tensions causes eccentric wear of the pulleys and a difference in number π of the pulleys, which causes a difference in feeding distances of the wire ropes. Thus, the wire ropes are slipped during driving of the pulleys, causing longitudinal and transverse vibrations, and directly causing vibrations to the elevator.

Accordingly, this causes a subsidiary breakdown of the elevator, shortening a life span and deteriorating a riding comfort of the elevator.

DISCLOSURE

Technical Problem

The present invention has been made in an effort to provide an apparatus for automatically equalizing tensions of elevator wire ropes which can immediately correct the changed lengths of the wire ropes of the wire ropes suspended on pulleys, when lengths of wire ropes become different by reciprocal mechanical movements, such as bending or expansion, can immediately solve the unbalance to equalize the tensions when tensions of the wire ropes are unbalanced by an unbalance of forces of the wire ropes.

Technical Solution

In order to solve these problems, according to an aspect of the present invention, there is provided an apparatus for automatically equalizing tensions of wire ropes, the apparatus including: a body having an accommodation space therein; a tension adjusting unit connected to first to fourth elevator wire ropes and installed within the body; a main shaft passing through the tension adjusting unit and rotatably coupled to an inner side of the body horizontally; and first to fourth guide rollers rotatably coupled to the body such that the first to fourth elevator wire ropes connected to the tension adjusting unit contact the first to fourth guide rollers at outer sides thereof.

The tension adjusting unit may include a first rotation unit coupled to the main shaft and in which the first wire rope is wound on an outer peripheral surface thereof; a second rotation unit coupled to the main shaft to be rotated in the same direction in conjunction with the first rotation unit and in which the second wire rope is wound on an outer peripheral surface thereof; a third rotation unit coupled to the main shaft to be rotated in the opposite direction in conjunction with the second rotation unit and in which the third wire rope is wound on an outer peripheral surface thereof; and a fourth rotation unit coupled to the main shaft to be rotated in the opposite direction in conjunction with the third rotation unit and in which the fourth wire rope is wound on an outer peripheral surface thereof.

The first rotation unit may include a first pulley coupled to the main shaft and having a disk at an inner side thereof, in which the first wire rope is wound on an outer peripheral surface thereof; a first ring gear having first inner teeth on an inner peripheral surface thereof and a portion of which is inserted into and engaged with an inner peripheral surface of an inner side of the first pulley; a first planetary gear unit having a plurality of first planetary gears engaged with a front surface of the disk of the first pulley and a plurality of second planetary gears engaged with a rear surface of the disk and only half of teeth of which are engaged with the teeth of the first planetary gears; and a first outer ring gear having inner teeth on an inner peripheral surface thereof such that the inner teeth are engaged with the remaining teeth of the first planetary gears and coupled to an opposite side of the first pulley.

The second rotation unit may include a second pulley having a disk coupled to the main shaft, in which the second wire rope is wound on an outer surface thereof, and into which the remaining part of the first ring gear is inserted and coupled; a second ring gear having second inner teeth on an inner peripheral surface thereof and only a portion of which is inserted into and coupled to an inner peripheral surface of one side of the second pulley; and a second planetary gear unit having a plurality of third planetary gears coupled to a front surface of the disk of the second pulley and only some of the teeth of which are coupled to the first inner teeth and a plurality of fourth planetary gears coupled to a rear surface of the disk and only some of the teeth of which are coupled to the third planetary gears.

The third rotation unit may include a third pulley having a disk coupled to the main shaft, in which the third wire rope is wound on an outer surface thereof, and into which the remaining part of the second ring gear is inserted and coupled; a third ring gear having third inner teeth on an inner peripheral surface thereof and only a portion of which is inserted into and coupled to an inner peripheral surface of one side of the third pulley; and a third planetary gear unit having a plurality of fifth planetary gears coupled to a front surface of the disk of the third pulley and only some of the teeth of which are coupled to the second inner teeth and a plurality of sixth planetary gears coupled to a rear surface of the disk and only some of the teeth of which are coupled to the fifth planetary gears.

The fourth rotation unit may include a fourth pulley having a disk coupled to the main shaft, in which the fourth wire rope is wound on an outer surface thereof, and into which the remaining part of the third ring gear is inserted and coupled; a fourth planetary gear unit having a plurality of seventh planetary gears coupled to a front surface of the disk of the fourth pulley and only some of the teeth of which are coupled to the third inner teeth and a plurality of eight planetary gears coupled to a rear surface of the disk and only some of the teeth of which are coupled to the seventh planetary gears; and a second outer ring gear having an inner teeth on an inner peripheral surface thereof such that the inner teeth are engaged with the remaining teeth of the eighth planetary gears and coupled to an inner peripheral surface of an opposite side of the first ring gear.

The first to fourth pulleys may have peripheral members having rope grooves into which the first to fourth wire ropes are inserted on outer peripheral surfaces thereof, and disks formed at inner sides of the peripheral members and coupled to the main shaft, and ring grooves may be formed by a predetermined depth on front and rear surfaces of the disks between outer peripheral portions of the disks and inner peripheral portions of the peripheral members such that only halves of the first to third ring gears are inserted into the ring grooves.

Advantageous Effects

According to the present invention, an unbalance of tensions of elevator wire ropes can be immediately solved to automatically equalize the tensions in real time when lengths of the wire ropes become different, thereby improving safety, durability, and reliability and the elevator wire ropes.

BEST MODE

Mode for Invention

Hereinafter, exemplary embodiments of the present invention will be described in detail with reference to the accompanying drawings.

The first embodiment of the present invention will be described below with reference to FIGS. 1 to 5.

Figure 1:
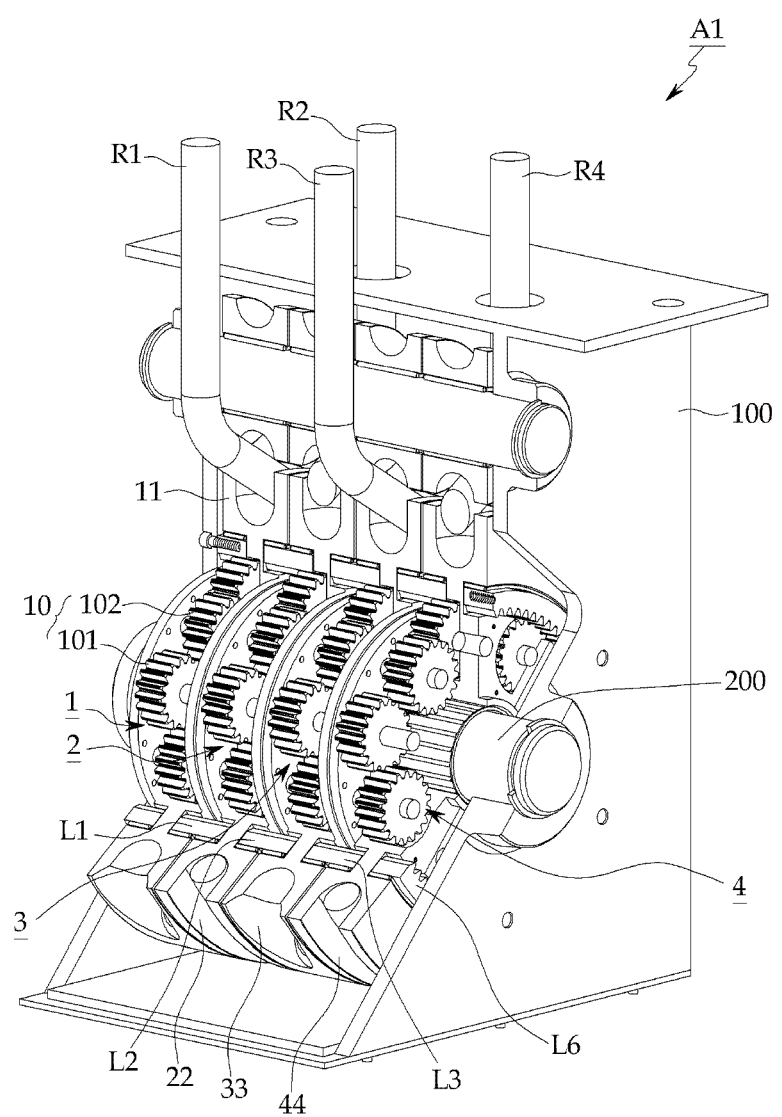
FIG. 1 is a partially sectional perspective view showing an assembled state of an apparatus for automatically equalizing tensions of elevator wire ropes according to the first embodiment of the present invention.
Figure 2:
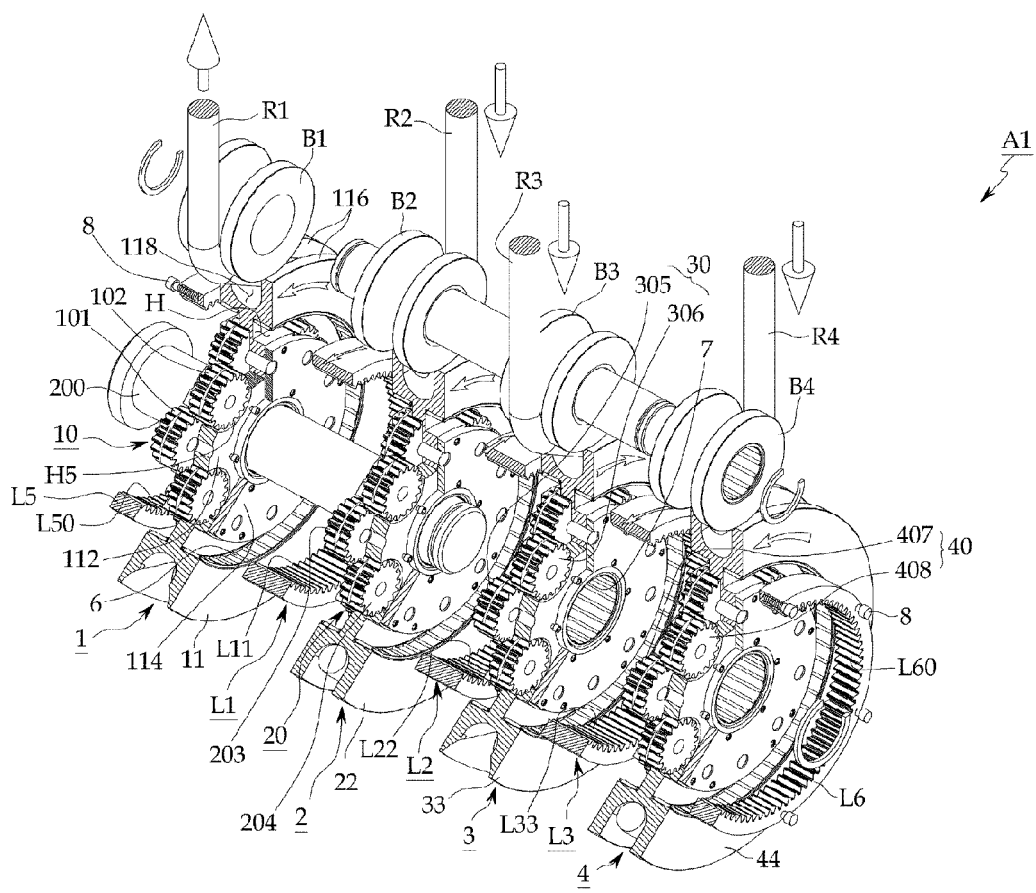
FIG. 2 is a partially sectional exploded perspective view showing the apparatus for automatically equalizing tensions of elevator wire ropes according to the first embodiment of the present invention.
Figure 3:
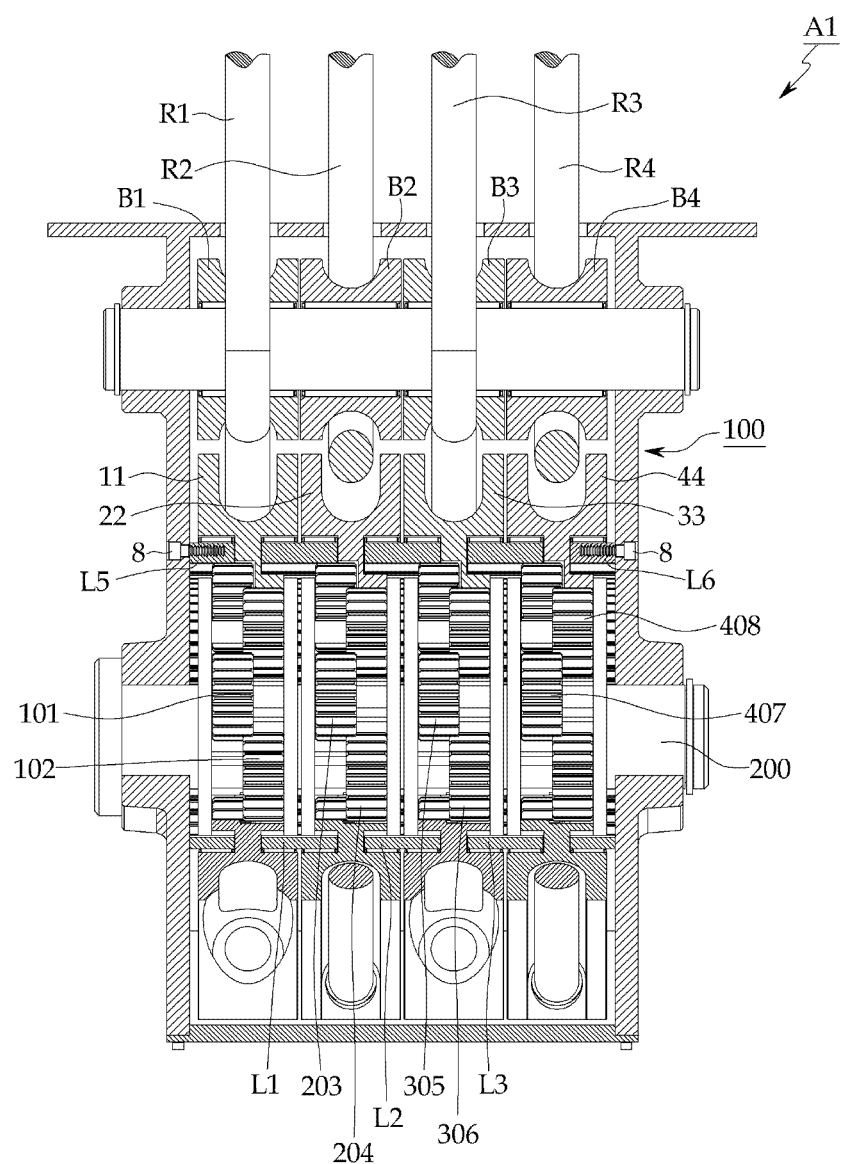
FIGS. 3 and 4 are front sectional views showing the apparatus for automatically equalizing tensions of elevator wire ropes according to the first embodiment of the present invention.
Figure 4:
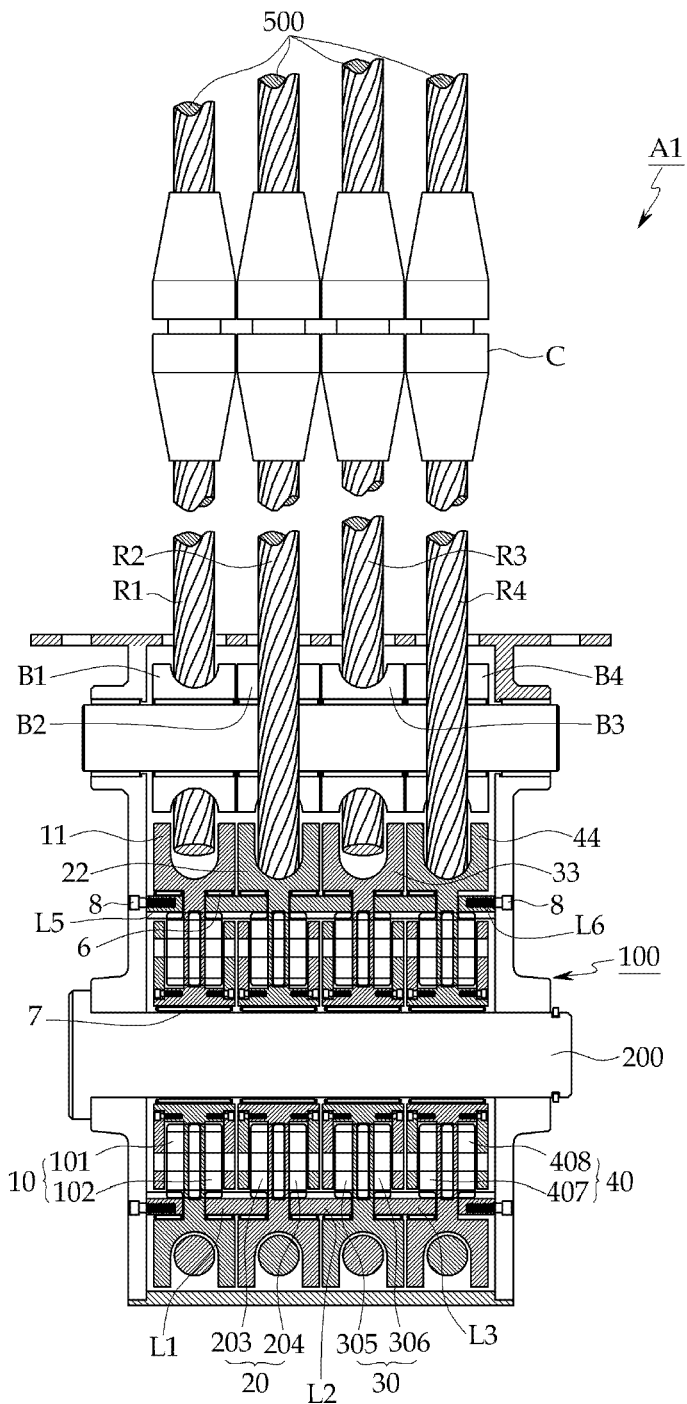
Figure 5:
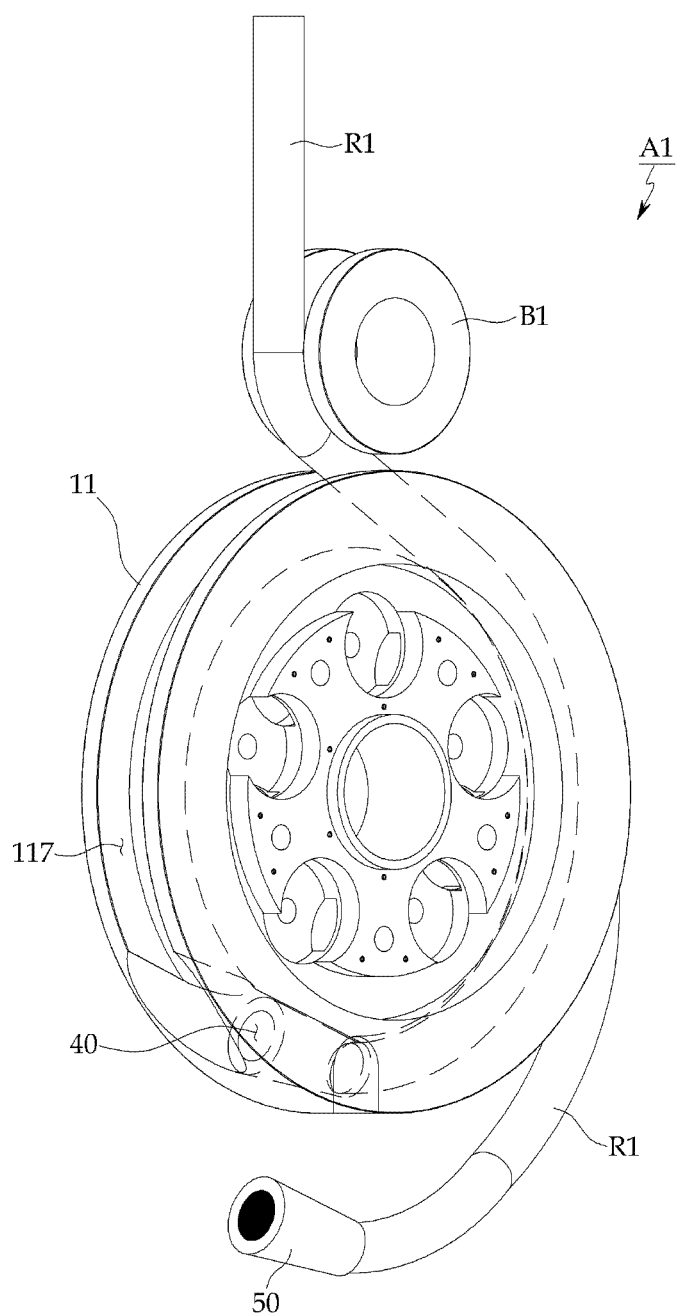
FIG. 5 is a view showing a first rotation unit of the apparatus for automatically equalizing tensions of elevator wire ropes according to the first embodiment of the present invention.
Figure 6:
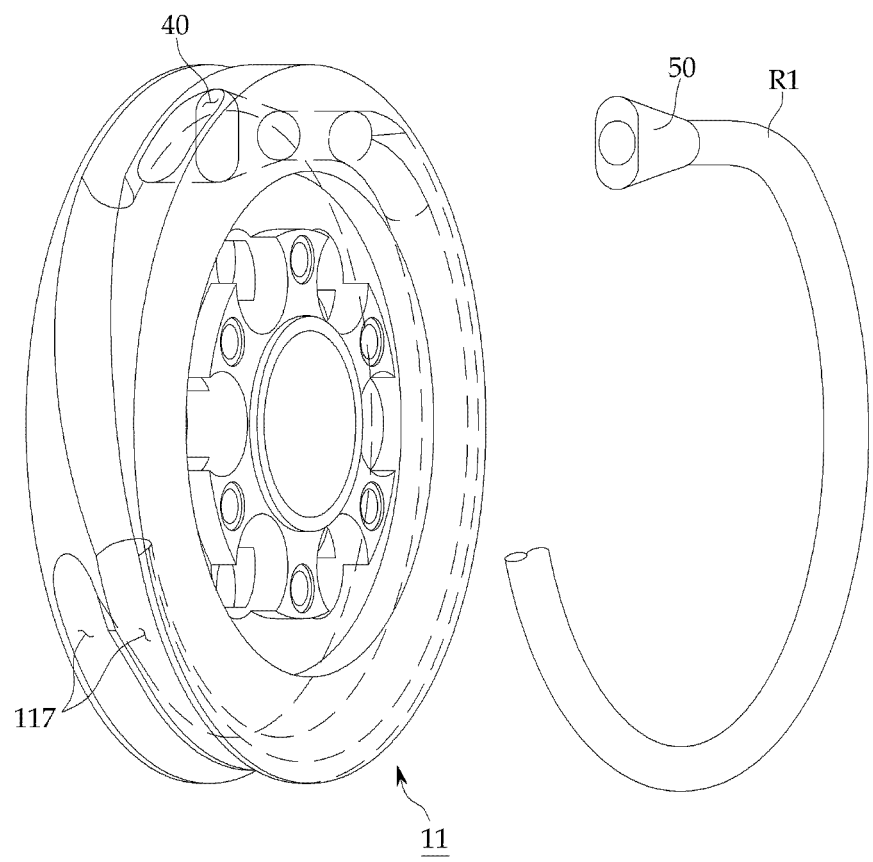
FIG. 6 is a view showing another example of the first rotation unit of the apparatus for automatically equalizing tensions of elevator wire ropes according to the first embodiment of the present invention.

FIG. 1 is a partially sectional perspective view showing an assembled state of an apparatus for automatically equalizing tensions of elevator wire ropes according to the first embodiment of the present invention. FIG. 2 is a partially sectional exploded perspective view showing the apparatus for automatically equalizing tensions of elevator wire ropes according to the first embodiment of the present invention. FIGS. 3 and 4 are front sectional views showing the apparatus for automatically equalizing tensions of elevator wire ropes according to the first embodiment of the present invention. FIG. 5 is a view showing a first rotation unit of the apparatus for automatically equalizing tensions of elevator wire ropes according to the first embodiment of the present invention. FIG. 6 is a view showing another example of the first rotation unit of the apparatus for automatically equalizing tensions of elevator wire ropes according to the first embodiment of the present invention.

As shown in FIGS. 1 to 5, the apparatus A1 for automatically equalizing tensions of wire ropes according to the first embodiment of the present invention includes a body 100 having an accommodation space therein, a tension adjusting unit connected to elevator wire ropes R1 to R4 and installed within the body 100, a main shaft 200 passing through the tension adjusting unit and rotatably coupled to an inner side of the body 100 horizontally; and first to fourth guide rollers B1 to B4 rotatably coupled to the body 100 such that the elevator wire ropes R1 to R4 connected to the tension adjusting unit contact the first to fourth guide rollers B1 to B4 at outer sides thereof.

The tension adjusting unit includes a first rotation unit 1 coupled to the main shaft 200 and in which the first wire rope R1 is wound on an outer peripheral surface thereof; a second rotation unit 2 coupled to the main shaft 200 to be rotated in conjunction with the first rotation unit 1 and in which the second wire rope R2 is wound on an outer peripheral surface thereof; a third rotation unit 3 coupled to the main shaft 200 to be rotated in conjunction with the second rotation unit 2 and in which the third wire rope R3 is wound on an outer peripheral surface thereof; and a fourth rotation unit 4 coupled to the main shaft 200 to be rotated in conjunction with the third rotation unit 3 and in which the fourth wire rope R4 is wound on an outer peripheral surface thereof.

The first rotation unit 1 includes a first pulley 11 coupled to the main shaft 200 and having a disk at an inner side thereof, in which the first wire rope R1 is wound on an outer peripheral surface thereof; a first ring gear L1 having first inner teeth L11 on an inner peripheral surface thereof and a portion of which is inserted into and engaged with an inner peripheral surface of an inner side of the first pulley 11; a first planetary gear unit 10 having a plurality of first planetary gears 101 engaged with a front surface of the disk of the first pulley 11 and a plurality of second planetary gears 102 engaged with a rear surface of the disk and only half of teeth of which are engaged with the teeth of the first planetary gears 101; and a first outer ring gear L5 having inner teeth L50 on an inner peripheral surface thereof such that the inner teeth L50 are engaged with the remaining teeth of the first planetary gears 101 and coupled to an opposite side of the first pulley 11.

The disk has gear engaging recesses H5 on front and rear surfaces thereof such that the first and second planetary gears 101 and 102 are buried in the gear engaging recesses H5, and shaft pins are formed in the gear engaging recesses H5, respectively, such that the first and second planetary gears 101 and 102 are rotatably coupled to the gear engaging recesses H5, respectively.

A plurality of gear engaging recesses H5 are alternately formed on front and rear surfaces of the disk so that the first and second planetary gears 101 and 102 engaged with the gear coupling recesses H5 are partially engaged with each other.

A cover plate 114 is attached to an outer surface of the disk to prevent the first and second planetary gears 101 and 102 from deviating from the disk.

Since disks mentioned in second to fourth rotation units 2 to 4 are the same as the disk in the first rotation unit 1, a description thereof will not be repeated below.

As mentioned above, only halves of the teeth on the outer peripheral surfaces of the first planetary gears 101 and the second planetary gears 102 are engaged with and coupled to each other.

Half the teeth on the outer peripheral surfaces of the second planetary gears 102 are engaged with the first planetary gears 101 and the remaining half teeth on the outer peripheral surfaces of the second planetary gears 102 are engaged with the first inner teeth L11 of the first ring gear L1.

Half the teeth on the outer peripheral surfaces of the first planetary gears 101 are engaged with the second planetary gears 102, and the remaining half teeth on the outer peripheral surfaces of the first planetary gears 101 are engaged with the inner teeth L50 of the first outer ring gear L1.

The second rotation unit 2 includes a second pulley 22 having a disk coupled to the main shaft 200, in which the second wire rope R2 is wound on an outer surface thereof, and into which the remaining part of the first ring gear L1 is inserted and coupled; a second ring gear L2 having second inner teeth L22 on an inner peripheral surface thereof and only a portion of which is inserted into and coupled to an inner peripheral surface of one side of the second pulley 22; and a second planetary gear unit 20 having a plurality of third planetary gears 203 coupled to a front surface of the disk of the second pulley 22 and only some of the teeth of which are coupled to the first inner teeth L11 and a plurality of fourth planetary gears 204 coupled to a rear surface of the disk and the teeth of which are coupled to the third planetary gears 203 and the second ring gear L2.

The third rotation unit 3 includes a third pulley 33 having a disk coupled to the main shaft 200, in which the third wire rope R3 is wound on an outer surface thereof, and into which the remaining part of the second ring gear L2 is inserted and coupled; a third ring gear L3 having third inner teeth L33 on an inner peripheral surface thereof and only a portion of which is inserted into and coupled to an inner peripheral surface of one side of the third pulley 33; and a third planetary gear unit 30 having a plurality of fifth planetary gears 305 coupled to a front surface of the disk of the third pulley 33 and only some of the teeth of which are coupled to the second inner teeth L22 and a sixth planetary gears 306 coupled to a rear surface of the disk and the teeth of which are coupled to the fifth planetary gears 305 and the third ring gear L3.

The fourth rotation unit 4 includes a fourth pulley 14 having a disk coupled to the main shaft 200, in which the fourth wire rope R4 is wound on an outer surface thereof, and into which the remaining part of the third ring gear L3 is inserted and coupled; a fourth planetary gear unit 40 having a plurality of seventh planetary gears 407 coupled to a front surface of the disk of the fourth pulley 44 and only some of the teeth of which are coupled to the third inner teeth L33 are coupled and a plurality of eight planetary gears 408 coupled to a rear surface of the disk and only some of the teeth of which are coupled to the seventh planetary gears 407; and a second outer ring gear L6 having an inner teeth L60 on an inner peripheral surface thereof such that the inner teeth L60 are engaged with the remaining teeth of the eighth planetary gears 408 and coupled to an inner peripheral surface of an opposite side of the first ring gear L1.

Each of the first to fourth pulleys 11, 12, 33, and 44 includes a peripheral member 116 having a rope groove 118 into which the first wire rope R1 is inserted on an outer peripheral surface thereof, and a disk 112 formed at an inner side of the peripheral member 116 and coupled to the main shaft 200.

Ring grooves H are formed by a predetermined depth on front and rear surfaces of the disk 112 between an outer periphery of the disk 112 and an inner periphery of the peripheral member 116 to be recessed inward such that the first to third ring gears L1 to L3 are coupled thereto.

The depth of the ring groove H is preferably set such that halves of the first to third ring gears L1 to L3 are inserted thereinto.

The first and second planetary gears 101 and 102 coupled to the first pulley 11, the third and fourth planetary gears 203 and 204 coupled to the second pulley 22, the fifth and sixth planetary gears 305 and 306 coupled to the third pulley 33, and the seventh and eighth planetary gears 407 and 408 coupled to the fourth pulley 44 are inserted into and coupled to the gear coupling recesses H5 formed on the front and rear surfaces of the disks of the pulleys, and the cover plates 114 are attached to the outer surfaces of the disks.

Some of the teeth of the first and second planetary gears 101 and 102, the third and fourth planetary gears 203 and 204, the fifth and sixth planetary gears 305 and 306, and the seventh and eighth planetary gears 407 and 408 protrude to the outside of the disks to be popped out to the ring grooves H, and thus may be coupled to the inner teeth L11, L22, and L33 of the first to third ring gears L1, L2, and L3 coupled to the ring grooves H of the first to fourth pulleys 11, 22, 33, and 44.

The first to fourth pulleys 11, 22, 33, and 44 are coupled to bearings 7 coupled to the main shaft 200 to be freely rotated separately from the main shaft 200.

Meanwhile, the first and third wire ropes R1 and R3 and the second and fourth wire ropes R2 and R4 are wound inversely to each other.

That is, as shown in FIGS. 1 and 2, the first and third wire ropes R1 and R3 is wound counterclockwise after catching members 50 are fixed to fixing holes 40 formed at front sides of the outer peripheral surfaces of the first and third pulleys 11 and 33 and face upper sides while being held on the first and third guide rollers B1 and B3, and upper ends of the first and third wire ropes R1 and R3 are connected to a main wire rope 500.

The second and fourth wire ropes R2 and R4 is wound clockwise after catching members 50 are fixed to fixing holes 40 formed at rear sides of the outer peripheral surfaces of the second and fourth pulleys 22 and 44 and face upper sides while being held on the second and fourth guide rollers B2 and B4, and upper ends of the second and fourth wire ropes R2 and R4 are connected to the main wire rope 500.

The upper ends of the first to fourth wire ropes R1 to R4 are connected to the main wire rope 500 through screwed connecting members C. Thus, the first to fourth wire ropes R1 to R4 and the main wire rope 500 can be coupled to or separated from each other by coupling the connecting members C.

The fixing holes 40 are formed at portions of the rope grooves 118 formed on the outer peripheral surfaces of the first to fourth pulleys 11, 22, 33, and 44 such that ends of the first wire ropes R1 may be fixed thereto, and the catching members 50 caught by the fixing holes 40 are formed at ends of the first wire ropes R1.

Each of the fixing holes 40 is tapered such that an entry thereof has a large diameter and an exit thereof has a small diameter so that the first wire rope R1 may be inserted thereinto.

The catching member 50 is attached to an end of the first wire rope R1, and is tapered to be inserted into the fixing hole 40.

The fixing holes 40 and the catching members 50 are also applied to the second to fourth pulleys 22, 33, and 44 and the second to fourth wire ropes R2 to R4, and a detailed description thereof will not be repeated.

Meanwhile, as shown in FIG. 6, two rows of the first to fourth pulleys 11, 22, 33, and 44 may be formed such that ropes may be wound twice on the rope grooves 118 formed on the outer peripheral surfaces thereof.

Of course, it is apparent that more than two rows of the first to fourth pulleys may be formed, and differences in deformations of the ropes can be sufficiently coped with in a high lift elevator by winding the several ropes.

The first to eighth planetary gears 101, 102, 203, 204, 305, 306, 407, and 408 are spur gears having a predetermined thickness.

In particular, as shown in FIG. 3, only halves of the teeth formed on the outer surfaces of the first and second planetary gears 101 and 102 are coupled to each other.

Likewise, the third and fourth planetary gears 203 and 204, the fifth and sixth planetary gears 305 and 306, and the seventh and eighth planetary gears 407 and 408 form pairs, respectively, and halves of the teeth formed on the outer surfaces thereof are set to be coupled to each other.

Needle bearings 6 are mounted between the outer peripheral surfaces of the first to third ring gears L1 to L3 and the inner peripheral surfaces of the first to fourth pulleys 11, 22, 33, and 44 such that the first to third ring gears L1 to L3 may be rotatably coupled to the first to fourth pulleys 11, 22, 33, and 44.

Further, needle bearings 6 are mounted between the outer peripheral surfaces of the first and second outer ring gears L1 and L6 and the inner peripheral surfaces of the first and fourth pulleys 11 and 44 such that the first and second outer ring gears L1 and L6 may be rotatably coupled to the first and fourth pulleys 11 and 44.

The first to third ring gears L1 to L3 have a predetermined width, and first to third inner teeth L11, L22, and L33 are formed on inner peripheral surfaces of the first to third ring gears L1 to L3 such that the second, fourth, and sixth planetary gears 102, 204, and 306 are engaged therewith.

Inner teeth L50 and L60 are also formed on the inner peripheral surfaces of the first and second outer ring gears L1 and L6 to be engaged with the first and eighth planetary gears 101 and 408 and the first and second outer ring gears L1 and L6 are coupled to the body 100 by bolts 8, and thus the first and second outer ring gears L1 and L6 are not influenced by revolutions of the first and eighth planetary gears 101 and 408 but further increase rotations of the second and seventh planetary gears 102 and 407 coupled to the first and eighth planetary gears 101 and 408.

Hereinafter, with reference to FIG. 2, an operation of the apparatus A1 for automatically equalizing tensions of elevator wire ropes according to the first embodiment of the present invention will be described.

When any one of the first to fourth wire ropes R1 to R4 is operated first, one of the first to fourth rotation units 1 to 4 coupled thereto will be operated first, and since the remaining rotation units are also connected to each other through gears, they will be sequentially operated through transfer of forces.

In the following description, an embodiment in which the first wire rope R1 is pulled upward and the first rotation unit 1 is operated in conjunction with the first wire rope R1 will be described, in which rotation directions of the elements are indicated by arrows and the left side in the drawings is called the front side.

First, an operation of the first rotation unit 1 of the first embodiment A1 will be described.

If the first wire rope R1 is pulled upward, the first pulley 11 is rotated counterclockwise and the first planetary gears 101 and the second planetary gears 102 coupled to the first pulley 11 are simultaneously revolved counterclockwise.

Then, the first planetary gears 101 are coupled to the first outer ring gear L5 which is fixed, and thus are rotated clockwise while being revolved.

The second planetary gears 102 engaged with the first planetary gears 101 are rotated counterclockwise.

The first ring gears L1 engaged with the second planetary gears 102 are rotated counterclockwise in conjunction with the counterclockwise rotation of the second planetary gears 102.

Then, the first gear L1 is rotated faster as the first planetary gears 101 are revolved and the second planetary gears 102 are rotated.

Next, an operation of the second rotation unit 2 of the first embodiment A1 will be described.

As the first ring gear L1 is rotated counterclockwise, the third planetary gears 203 coupled thereto are rotated and revolved counterclockwise and the second pulley 22 is rotated counterclockwise at the same time when the third planetary gears 203 are revolved, lowering the second wire rope R2.

That is, an end of the second wire rope R2 is fixed to a rear side of the second pulley 22, and if the second pulley 22 is rotated counterclockwise, the second wire rope R2 is pulled and lowered while being wound.

Meanwhile, the fourth planetary gears 204 engaged with the third planetary gears 203 are revolved counterclockwise like the second pulley 22 but is rotated clockwise.

Then, since a rotation speed of the fourth planetary gears 204 is higher than a revolution speed of the second pulley 22, the second ring gear L2 is rotated fast clockwise.

Next, an operation of the third rotation unit 3 of the first embodiment A1 will be described.

As the second ring gear L2 is rotated clockwise at a high speed, the fifth planetary gears 305 are revolved clockwise and rotated clockwise.

As the third pulley 33 is rotated clockwise at the same time when the fifth planetary gears 305 are revolved, the third wire rope R3 is lowered.

An end of the third wire rope R3 is fixed to a front side of the third pulley 33, and if the third pulley 33 is rotated clockwise, the third wire rope R3 is lowered while being wound.

Meanwhile, the sixth planetary gears 306 coupled to the fifth planetary gears 305 are revolved clockwise like the third pulley 33, but are rotated counterclockwise.

Then, since a rotation speed of the sixth planetary gears 306 is higher than a revolution speed of the third pulley 33, the third ring gear L3 is rotated fast counterclockwise.

Next, an operation of the fourth rotation unit 4 of the first embodiment A1 will be described.

As the third ring gear L3 is rotated counterclockwise, the third planetary gears 407 coupled thereto are revolved and rotated counterclockwise.

The eighth planetary gears 408 engaged with the seventh planetary gears 407 are revolved counterclockwise, but are rotated clockwise.

Since the eighth planetary gears 408 are coupled to the second outer ring gear L6 but the second outer ring gear L6 is fixed to the body 100 through a bolt, the fourth pulley 44 is rotated counterclockwise and as a result, the fourth wire rope R4 wound on the fourth pulley 44 is rotated in the winding direction.

Figure 7:
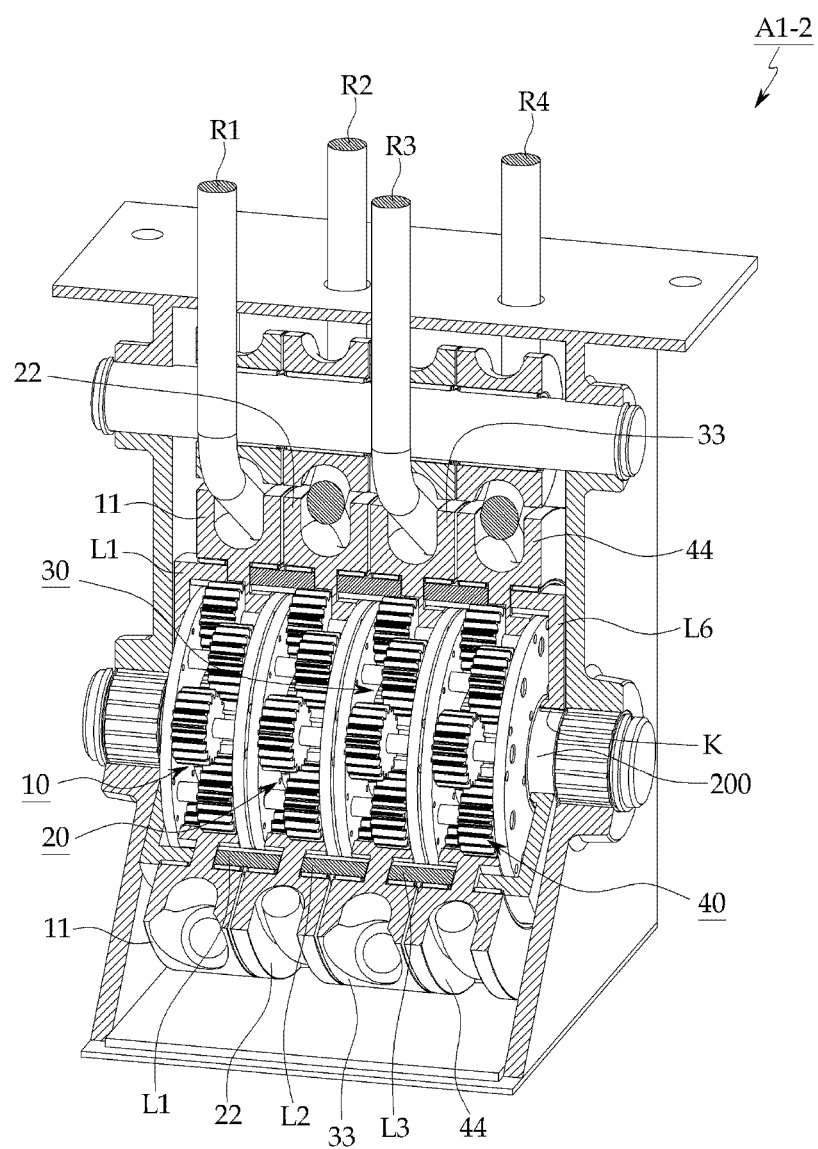
FIG. 7 is a partially sectional perspective view showing an assembled state of an apparatus for automatically equalizing tensions of elevator wire ropes according to a modified example of the first embodiment of the present invention.
Figure 8:
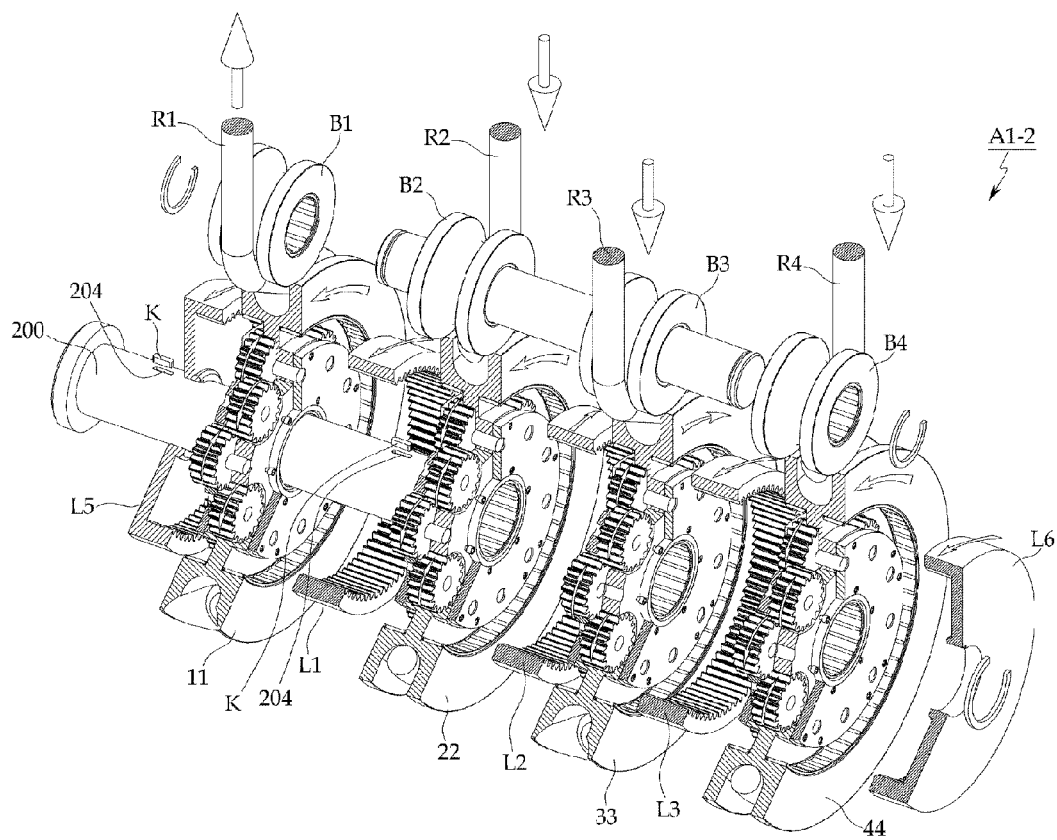
FIG. 8 is a partially sectional exploded perspective view showing an apparatus for automatically equalizing tensions of elevator wire ropes according to a modified example of the first embodiment of the present invention.

Meanwhile, FIG. 7 is a partially sectional perspective view showing an assembled state of an apparatus for automatically equalizing tensions of elevator wire ropes according to a modified example of the first embodiment of the present invention. FIG. 8 is a partially sectional exploded perspective view showing an apparatus for automatically equalizing tensions of elevator wire ropes according to a modified example of the first embodiment of the present invention.

As shown in FIGS. 7 and 8, in the apparatus A1-2 for automatically equalizing tensions of elevator wire ropes according to a modified example of the first embodiment of the present invention, the first and second outer ring gears L1 and L6 are rotated at the same time when the main shaft 200 is rotated.

That is, as the first and second outer ring gears L1 and L6 are not fixed to the body 100 but are coupled to the main shaft 200, the first and second outer ring gears L1 and L6 are rotated in conjunction with rotations of the first and eighth planetary gears 101 and 408.

The first and second outer ring gears L1 and L6 are fixed to the main shaft 200 through general key K coupling.

That is, after grooves are formed in the main shaft 200 and grooves are also formed on inner peripheral surfaces of central holes of the first and second outer ring gears L1 and L6, keys K are press-fitted into the grooves to fix the first and second outer ring gears L1 and L6.

Thus, the first and second outer ring gears L1 and L6 may be rotated at the same time when the main shaft 200 is rotated, and thus a mechanical operation time, that is, an organic response time for which the first to fourth pulleys 11, 22, 33, and 44 are rotated in conjunction with rotations of the first and second outer ring gears L1 and L6 can become shorter.

Figure 10:
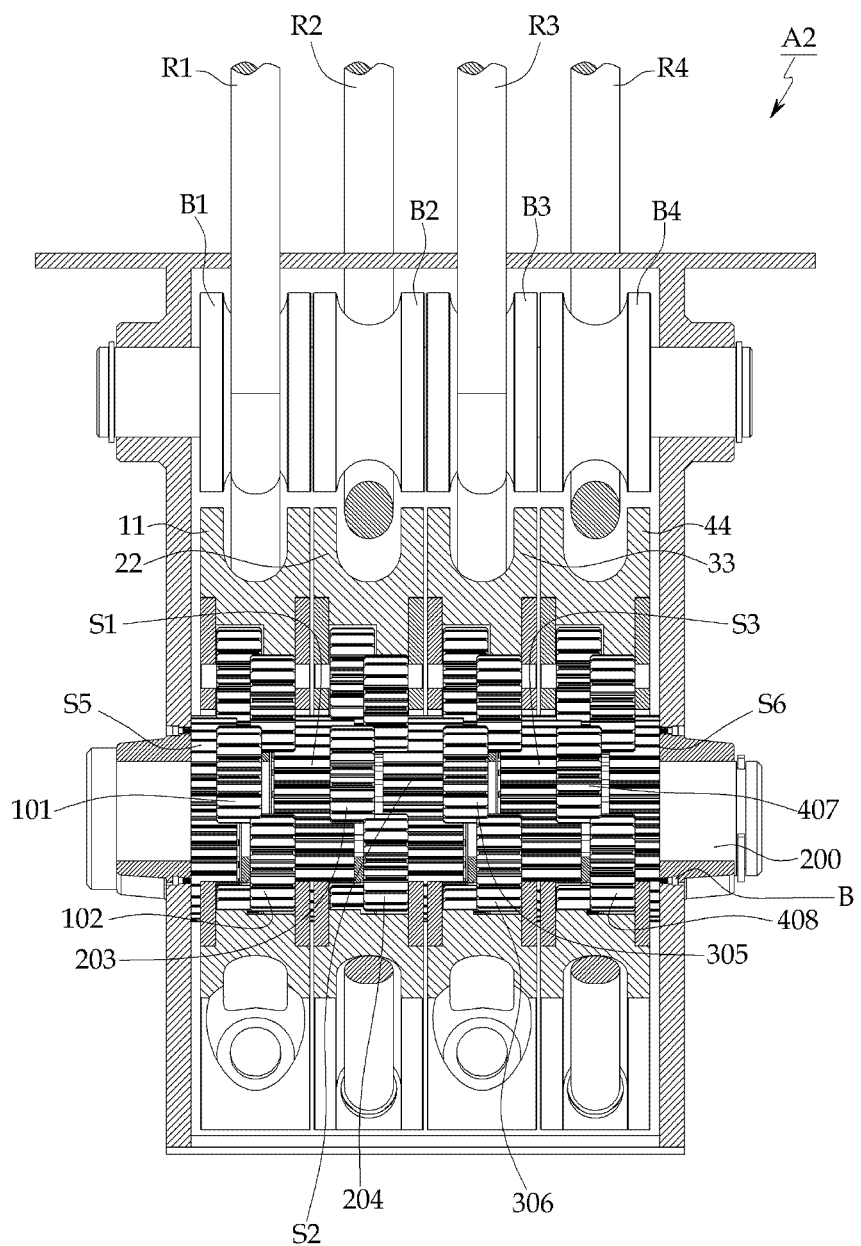
FIG. 10 is a front sectional view showing the apparatus for automatically equalizing tensions of elevator wire ropes according to the second embodiment of the present invention.
Figure 11:
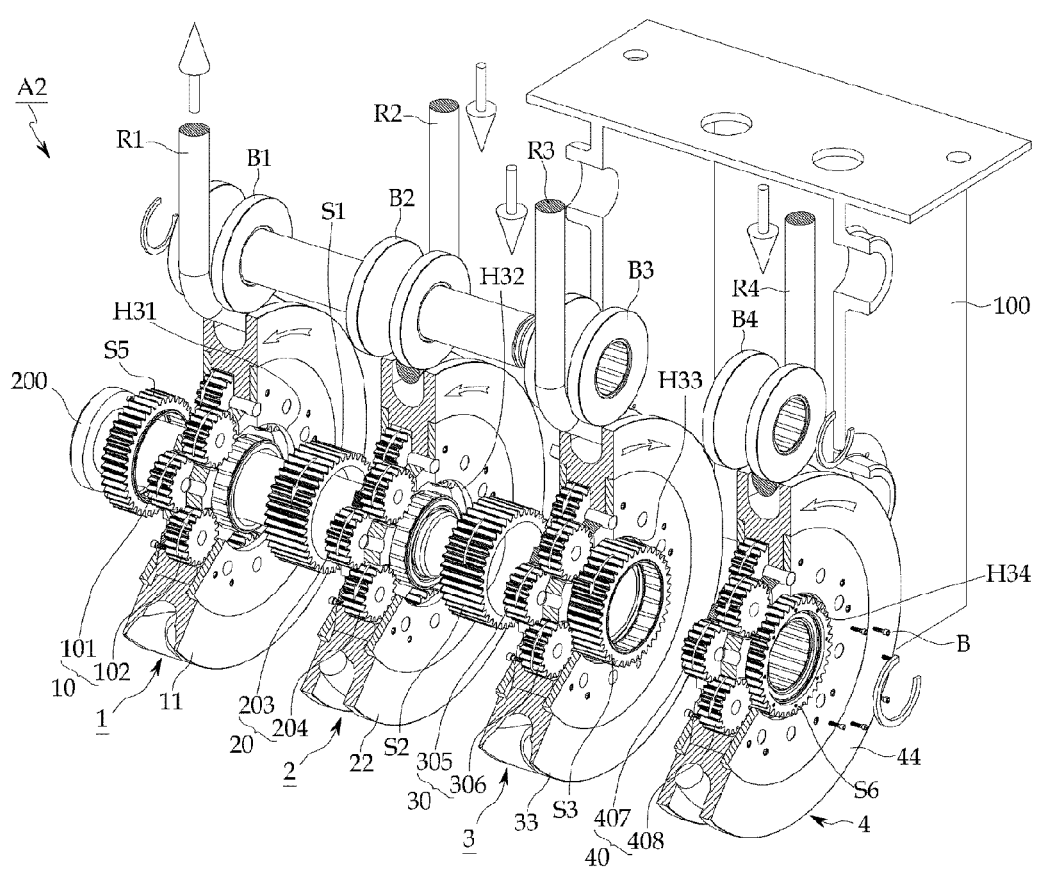
FIG. 11 is a partially sectional exploded perspective view showing the apparatus for automatically equalizing tensions of elevator wire ropes according to the second embodiment of the present invention.

Next, the second embodiment of the present invention will be described based on FIGS. 9 to 11.

In the second embodiment, the ring gear is excluded and a sun gear is adopted.

Figure 9:
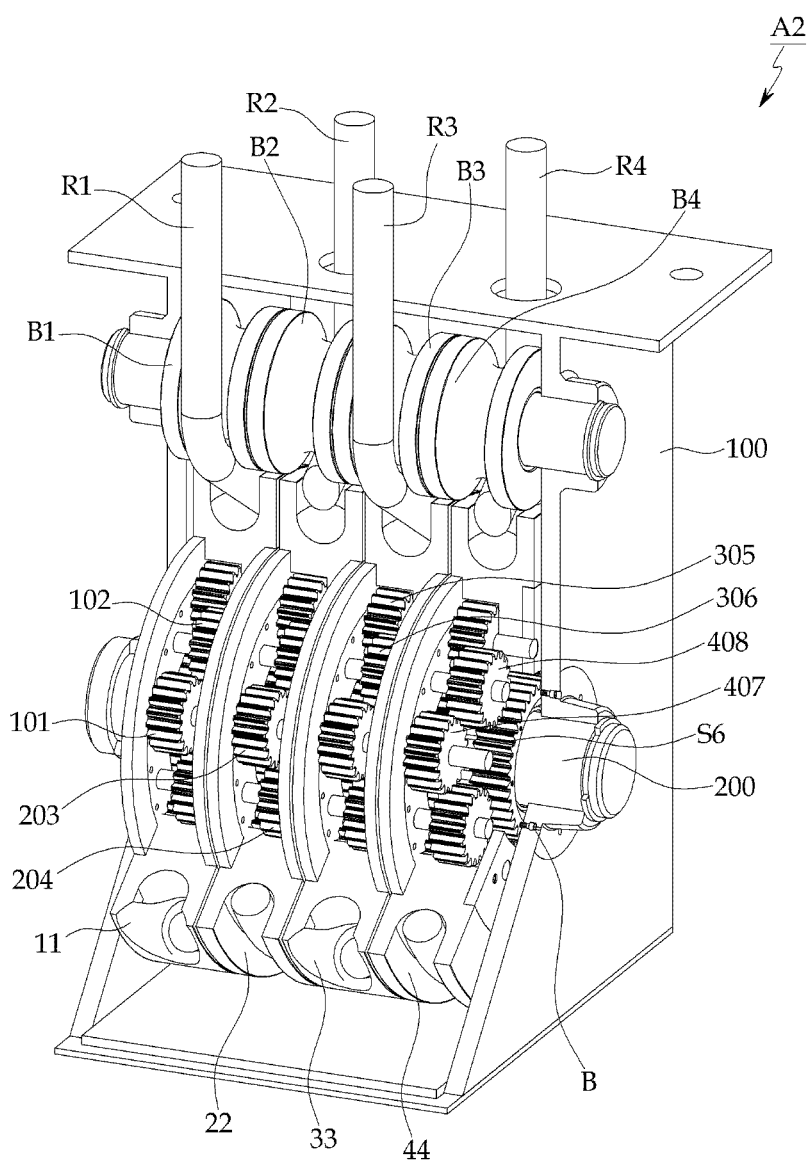
FIG. 9 is a partially sectional perspective view showing an assembled state of an apparatus for automatically equalizing tensions of elevator wire ropes according to the second embodiment of the present invention.
Figure 12A:
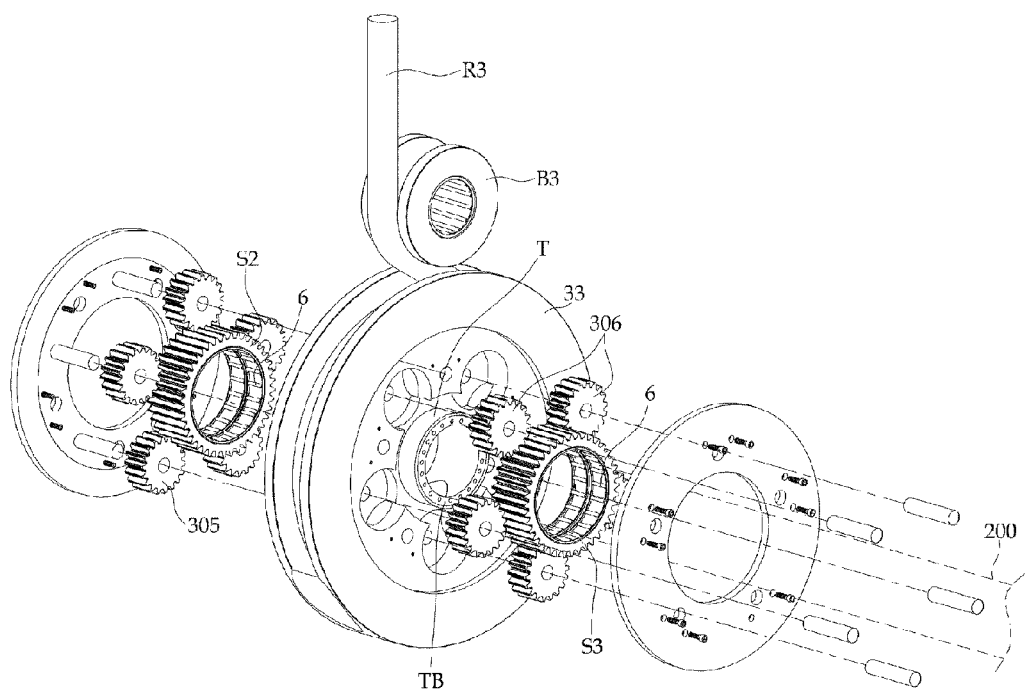
FIGS. 12A and 12B are an exploded perspective view showing a part of FIG. 11 and a front sectional view showing an assembled state thereof.
Figure 12B:
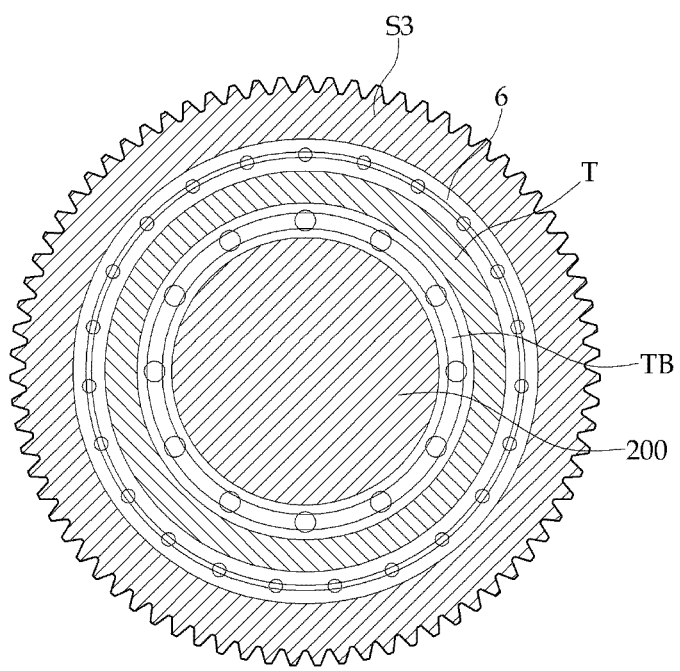

FIG. 9 is a partially sectional perspective view showing an assembled state of an apparatus for automatically equalizing tensions of elevator wire ropes according to the second embodiment of the present invention. FIG. 10 is a front sectional view showing the apparatus for automatically equalizing tensions of elevator wire ropes according to the second embodiment of the present invention. FIG. 11 is a partially sectional exploded perspective view showing the apparatus for automatically equalizing tensions of elevator wire ropes according to the second embodiment of the present invention. FIGS. 12A and 12B are an exploded perspective view showing a part of FIG. 11 and a front sectional view showing an assembled state thereof.

As shown in FIGS. 9 to 12B, the apparatus A2 for automatically equalizing tensions of elevator wire ropes according to the second embodiment of the present invention includes a body 100 having an accommodation space therein, a tension adjusting unit connected to elevator wire ropes R1 to R4 and installed within the body 100, a main shaft 200 passing through the tension adjusting unit and rotatably coupled to an inner side of the body 100 horizontally; and first to fourth guide rollers B1 to B4 rotatably coupled to the body 100 such that the elevator wire ropes R1 to R4 connected to the tension adjusting unit contact the first to fourth guide rollers B1 to B4 at outer sides thereof.

The tension adjusting unit includes a first rotation unit 1 coupled to the main shaft 200 and in which the first wire rope R1 is wound on an outer peripheral surface thereof; a second rotation unit 2 coupled to the main shaft 200 to be rotated in the same or opposite direction in conjunction with the first rotation unit 1 and in which the second wire rope R2 is wound on an outer peripheral surface thereof; a third rotation unit 3 coupled to the main shaft 200 to be rotated in the opposite or same direction in conjunction with the second rotation unit 2 and in which the third wire rope R3 is wound on an outer peripheral surface thereof; and a fourth rotation unit 4 coupled to the main shaft 200 to be rotated in the opposite or same direction in conjunction with the third rotation unit 3 and in which the fourth wire rope R4 is wound on an outer peripheral surface thereof.

The first rotation unit 1 includes a first pulley 11 in which the first wire rope R1 is wound on an outer peripheral surface thereof and having a disk 112 having a through-hole H31 at an inner side thereof; a first planetary gear unit 10 having a plurality of first planetary gears 101 engaged with a front surface of the disk 112 of the first pulley 11 and a plurality of second planetary gears 102 engaged with a rear surface of the disk 112 and only half of teeth on an outer peripheral surface of which are engaged with the teeth of the first planetary gears 101; a first sun gear S1 into which the main shaft 200 is inserted, coupled to an outer side of a mounting part T formed at a central portion of the first pulley 11, and inserted into the through-hole H31 to be coupled to the second planetary gears 102; and a first outer sun gear S5 rotatably coupled to the main shaft 200 and inserted into the through-hole H31 to be engaged with the remaining teeth of the first planetary gears 101.

The second rotation unit 2 includes a second pulley 22 in which the second wire rope R2 is wound on an outer peripheral surface thereof and having a disk 112 having a through-hole H32 at an inner side thereof; a second planetary gear unit 20 having a plurality of third planetary gears 203 engaged with a front surface of the disk 112 of the second pulley 22 and some of teeth of which are engaged with the first sun gear S1 and a plurality of fourth planetary gears 204 engaged with a rear surface of the disk 112 and only some of teeth of which are engaged with the third planetary gears 203; a second sun gear S2 into which the main shaft 200 is inserted, coupled to an outer side of a mounting part T formed at a central portion of the second pulley 22, inserted into the through-hole H32, and only some of teeth of which are engaged with the fourth planetary gears 204.

The third rotation unit 3 includes a third pulley 33 in which the third wire rope R3 is wound on an outer peripheral surface thereof and having a disk 112 having a through-hole H33 at an inner side thereof; a third planetary gear unit 30 having a plurality of fifth planetary gears 305 coupled to a front surface of the disk 112 of the third pulley 33 and only some of teeth of which are engaged with the second sun gear S2 and a plurality of sixth planetary gears 306 engaged with a rear surface of the disk 112 and only some of teeth of which are engaged with the teeth of the fifth planetary gears 305; a third sun gear S3 into which the main shaft 200 is inserted, coupled to an outer side of a mounting part T formed at a central portion of the third pulley 33, inserted into the through-hole H33, and only some of teeth of which are engaged with the sixth planetary gears 306.

A coupling of the third sun gear S3 will be described below in detail with reference to FIGS. 12A and 12B. The mounting part T is a cylindrical protrusion formed at a central portion of the third pulley 33, a bearing TB is mounted to an inner peripheral surface of an inner hole of the mounting part T, and the main shaft 200 is coupled to the bearing TB.

A needle bearing 6 is coupled to an outer peripheral surface of the mounting part T, and the third sun gear S3 is coupled to the needle bearing 6.

Coupling structures of the first and second sun gears S1 and S2, and the fourth sun gear S4 which will be described below are the same as that of the third sun gear S3, and a description thereof will not be repeated.

The fourth rotation unit 4 includes a fourth pulley 44 in which the fourth wire rope R4 is wound on an outer peripheral surface thereof and having a disk 112 having a through-hole H34 at an inner side thereof; a fourth planetary gear unit 40 having a plurality of seventh planetary gears 407 coupled to a front surface of the disk 112 of the fourth pulley 44 and some of teeth of which are engaged with the third sun gear S3 and a plurality of eighth planetary gears 408 coupled to a rear surface of the disk 112 and some of teeth of which are engaged with the seventh planetary gears 407; a second outer sun gear S6 into which the main shaft 200 is inserted, coupled to an outer side of a mounting part T formed at a central portion of the fourth pulley 44, inserted into the through-hole H34, and some of teeth of which are engaged with the eighth planetary gears 408.

Hereinafter, an operation of the apparatus A2 for automatically equalizing tensions of elevator wire ropes according to the second embodiment of the present invention will be described with reference to FIG. 11.

In the following description, rotation directions are indicated by arrows.

First, an operation of the first rotation unit 1 of the second embodiment A2 will be described.

If the first wire rope R1 is pulled upward, the first pulley 11 is rotated counterclockwise and the first and second planetary gears 101 and 102 mounted to the disk 112 in the first pulley 11 are revolved counterclockwise.

The first planetary gears 101 are revolved along an outer circumference of the first outer sun gear S5 fixed to the body 100 and is rotated counterclockwise at the same time.

The second planetary gears 102 engaged with the first planetary gears 101 are rotated clockwise, and the first sun gear S1 engaged with the second planetary gears 102 are rotated counterclockwise.

Then, a rotation speed of the first sun gear S1 is twice a rotation speed of the first pulley 11.

Next, an operation of the second rotation unit 2 of the second embodiment A2 will be described.

Thereafter, the third planetary gears 203 are revolved counterclockwise while being rotated clockwise by the counterclockwise rotation of the first sun gear S1.

Thereafter, the fourth planetary gears 204 engaged with the third planetary gears 203 are revolved counterclockwise while being rotated counterclockwise, and the second pulley 22 is rotated counterclockwise at the same time when the fourth planetary gears 204 are revolved, lowering the second wire rope R2.

That is, an end of the second wire rope R2 is fixed to a rear side of the second pulley 22, and if the second pulley 22 is rotated counterclockwise, the second wire rope R2 is pulled and lowered while being wound.

Meanwhile, the second sun gear S2 engaged with the fourth planetary gears 204 are rotated clockwise, and are rotated at a speed higher than a revolution speed of the second pulley 22.

Next, an operation of the third rotation unit 3 of the second embodiment A2 will be described.

The fifth planetary gears 305 engaged with the second sun gear S2 are revolved clockwise while being rotated counterclockwise, and the sixth planetary gears 306 engaged with the fifth planetary gear 305 are rotated clockwise and revolved clockwise at the same time, whereby the third wire rope R3 is pulled downward as the third pulley 33 is rotated clockwise.

An end of the third wire rope R3 is fixed to a front side of the third pulley 33, and if the third pulley 33 rotated clockwise, the third wire rope R3 is pulled and lowered while being wound.

Meanwhile, the sixth planetary gears 306 engaged with the fifth planetary gears 305 are revolved and rotated clockwise in the same direction as a rotation direction of the third pulley 33.

Then, since a rotation speed of the sixth planetary gears 306 is higher than a revolution speed of the third pulley 33, the third sun gear S3 is rotated fast counterclockwise.

Next, an operation of the fourth rotation unit 4 of the second embodiment A2 will be described.

As the third sun gear S3 is rotated counterclockwise, the seventh planetary gears 407 engaged therewith are revolved counterclockwise while being rotated clockwise and the eighth planetary gears 408 engaged with the seventh planetary gears 407 are rotated and revolved counterclockwise.

Then, as the fourth pulley 44 is rotated counterclockwise by the counterclockwise revolution of the eighth planetary gears 408, the fourth wire rope R4 is pulled downward.

In the apparatus A2 for automatically equalizing tensions of elevator wire ropes according to the second embodiment of the present invention, the first and second outer sun gears S5 and S6 are fixed to the body 100 by coupling bolts 8.

However, the first and second outer sun gears S5 and S6 may not be fixed to the body 100 but may be fixed to the main shaft 200.

Figure 13:
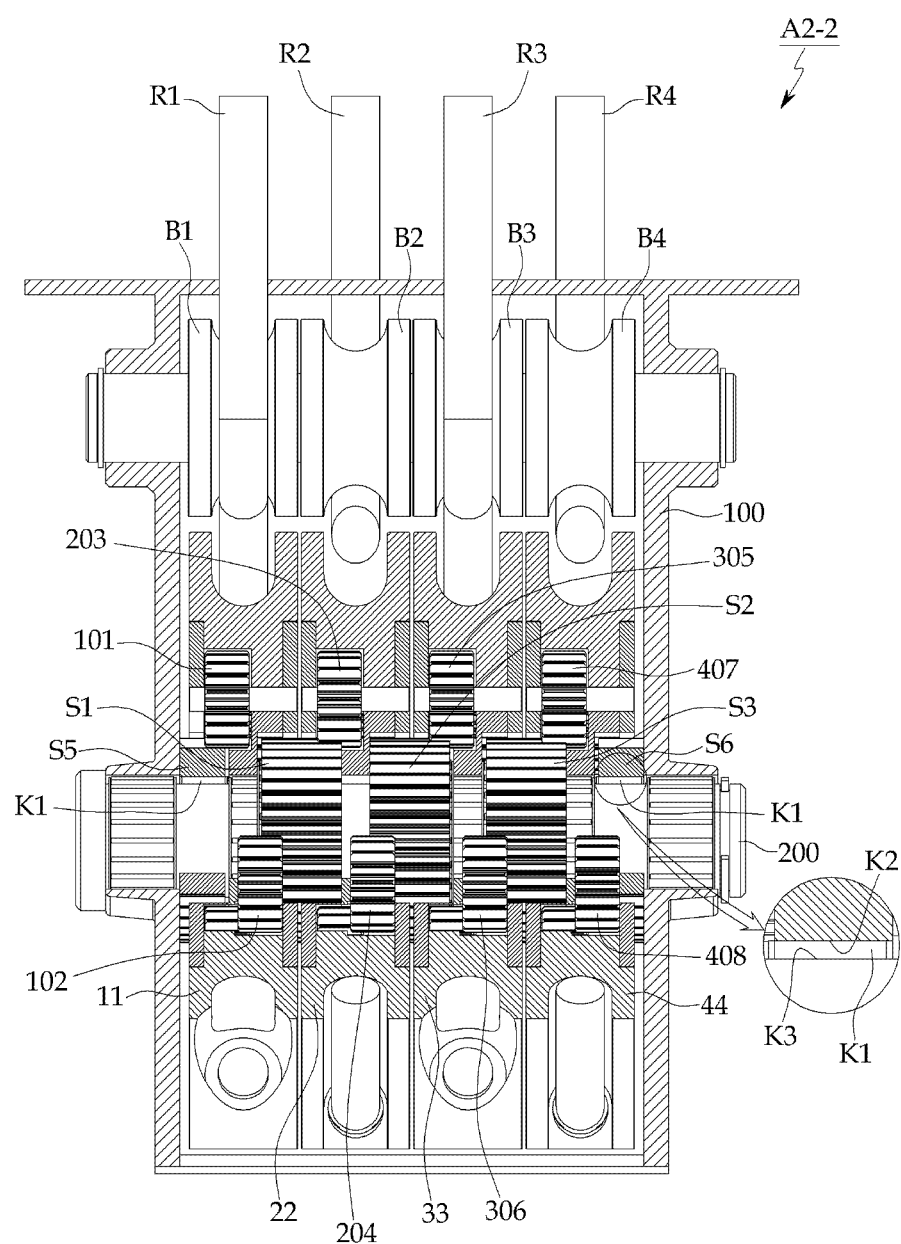
FIG. 13 is a front sectional view showing an apparatus for automatically equalizing tensions of elevator wire ropes according to another example of the second embodiment of the present invention.
Figure 14:
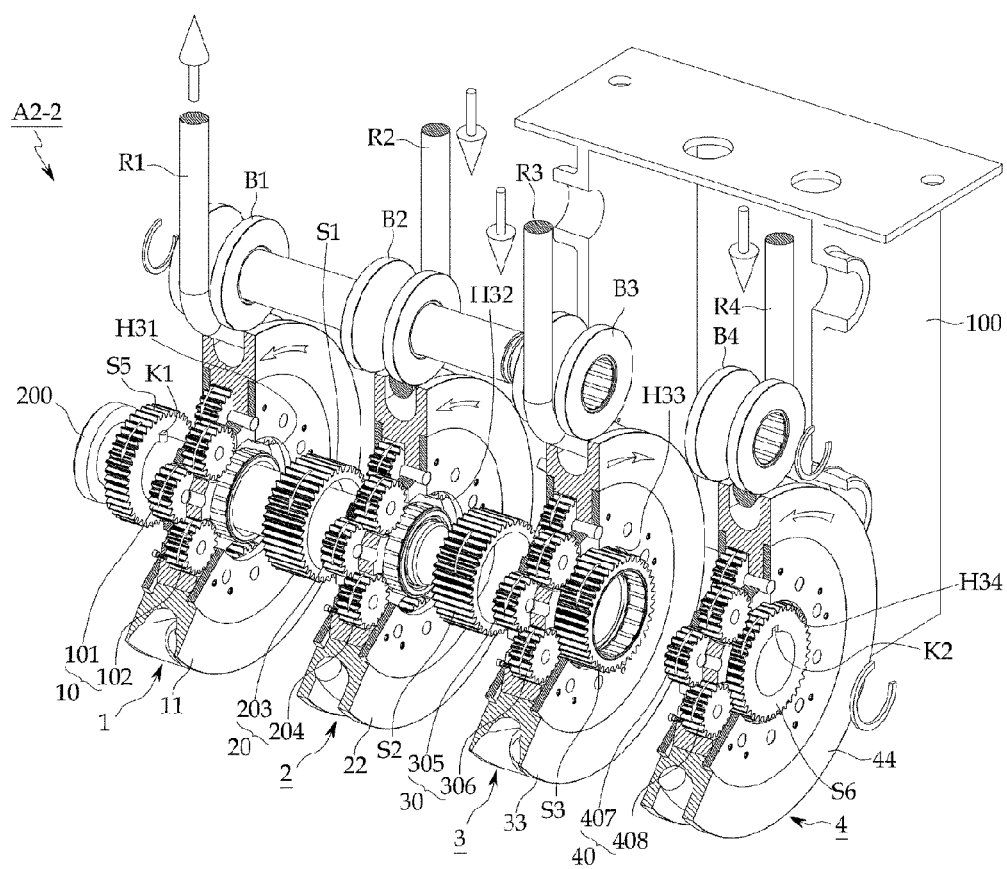
FIG. 14 is a partially sectional exploded perspective view showing an apparatus for automatically equalizing tensions of elevator wire ropes according to another example of the second embodiment of the present invention.

FIG. 13 is a front sectional view showing an apparatus for automatically equalizing tensions of elevator wire ropes according to another example of the second embodiment of the present invention. FIG. 14 is a partially sectional exploded perspective view showing an apparatus for automatically equalizing tensions of elevator wire ropes according to another example of the second embodiment of the present invention.

As shown in FIGS. 13 and 14, the apparatus A2-2 for automatically equalizing tensions of elevator wire ropes according to another example of the second embodiment of the present invention is the same as the second embodiment A2, but differs from the second embodiment A2 in that the first and second outer sun gears S5 and S6 are fixed to the main shaft 200 by coupling general keys K.

That is, the difference lies in that after key grooves K2 are formed in the main shaft 200 and key grooves K3 are also formed on inner peripheral surfaces of central holes of the first and second outer sun gears S5 and S6, keys K1 are press-fitted into the key grooves K2 and K3 to fix the first and second outer sun gears S5 and S6.

Thus, an operation of the another example A2-2 of the second embodiment of the present invention is substantially the same as the second embodiment A2, and a detailed description thereof will not be repeated.

However, the first and second outer sun gears S5 and S6 can rotate the main shaft coupled thereto due to the difference.

Thus, the second to fourth pulleys 22 to 44 can promptly cope with a change in the first pulley 11.

Next, the third embodiment of the present invention will be described with reference to FIGS. 15 to 17.

The third embodiment corresponds to a structure in which a disk is rotatably coupled to an intermediate portion of a sun gear.

Figure 15:
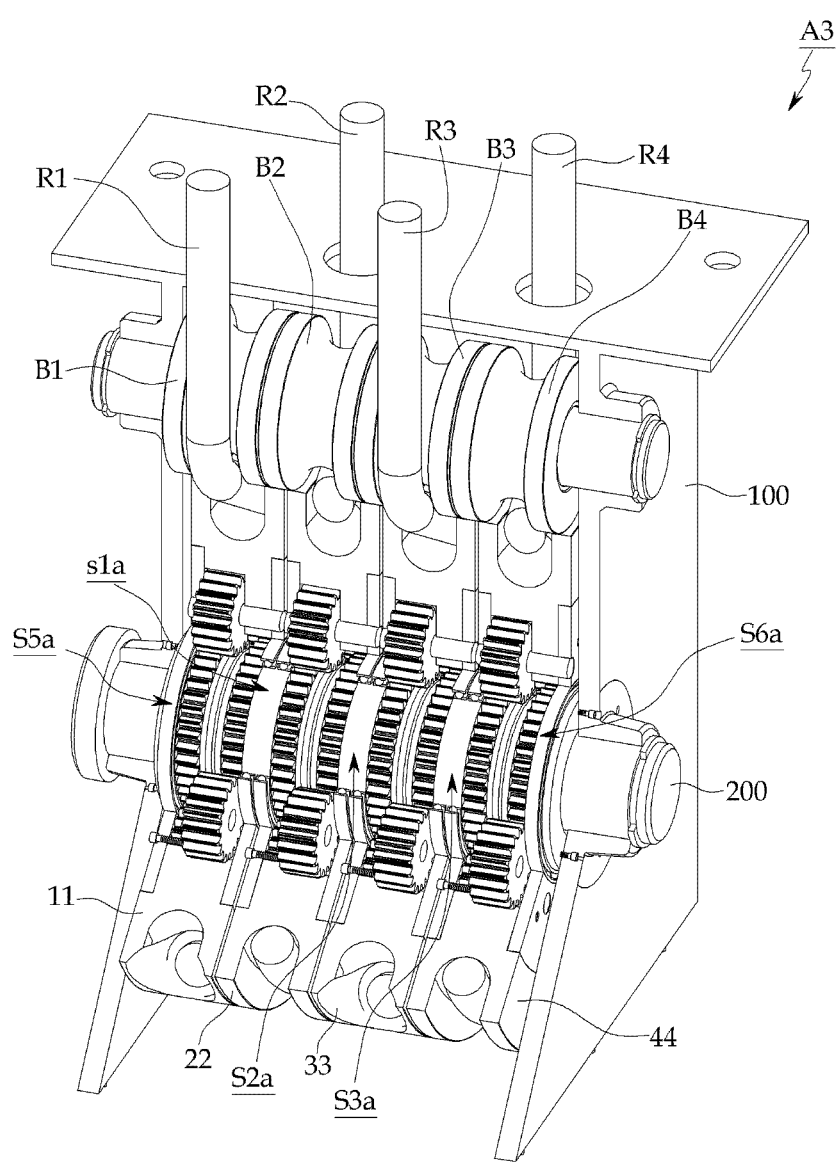
FIG. 15 is a partially sectional perspective view showing an assembled state of an apparatus for automatically equalizing tensions of elevator wire ropes according to the third embodiment of the present invention.

FIG. 15 is a partially sectional perspective view showing an assembled state of an apparatus for automatically equalizing tensions of elevator wire ropes according to the third embodiment of the present invention. FIG. 16 is a front sectional view showing the apparatus for automatically equalizing tensions of elevator wire ropes according to the third embodiment of the present invention. FIG. 17 is a partially sectional exploded perspective view showing the apparatus for automatically equalizing tensions of elevator wire ropes according to the third embodiment of the present invention.

Figure 16:
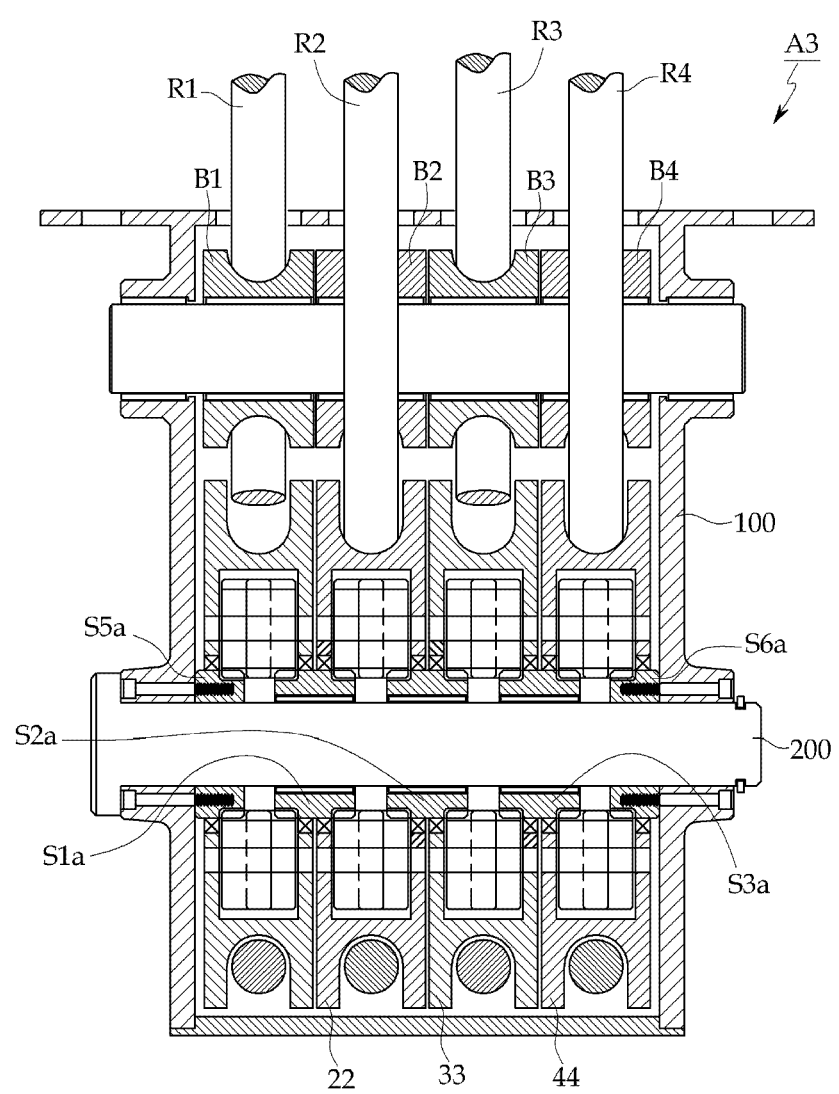
FIG. 16 is a front sectional view showing the apparatus for automatically equalizing tensions of elevator wire ropes according to the third embodiment of the present invention.
Figure 17:
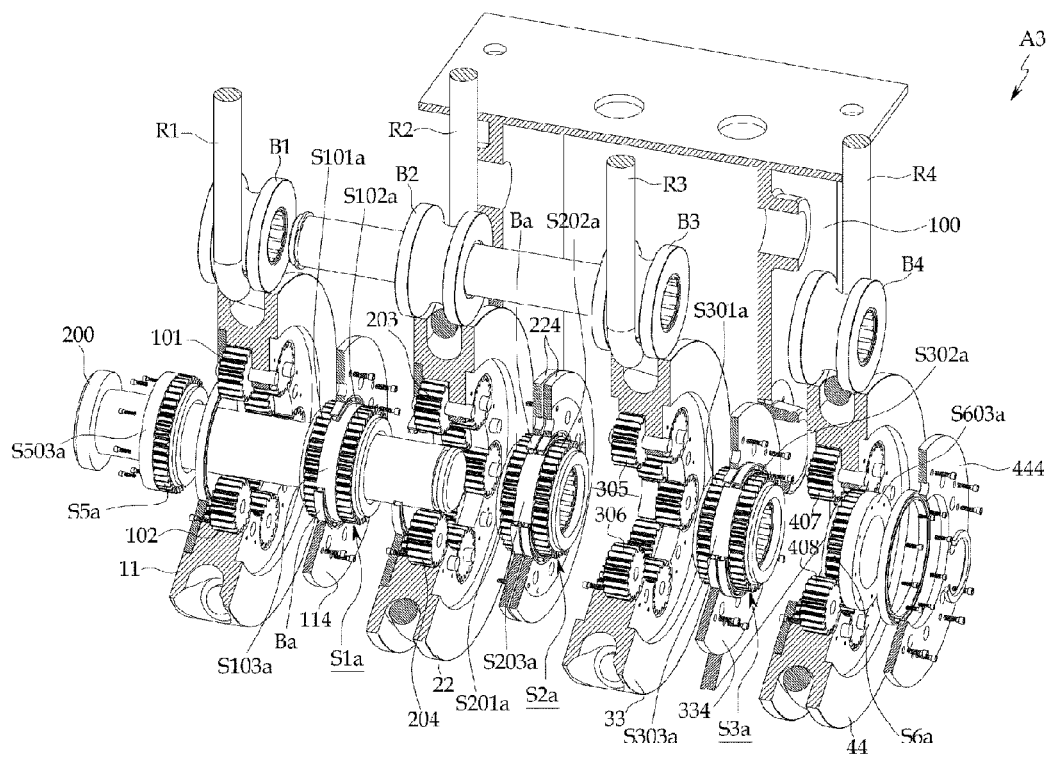
FIG. 17 is a partially sectional exploded perspective view showing the apparatus for automatically equalizing tensions of elevator wire ropes according to the third embodiment of the present invention.

As shown in FIGS. 15 to 17, the apparatus A3 for automatically equalizing tensions of elevator wire ropes according to the third embodiment of the present invention is substantially the same as the above-described second embodiment A2, and a detailed description of the elements will not be repeated.

However, the third embodiment A3 differs from the second embodiment A2 in that the shapes of the first to third sun gears S1a, S2a, and S3a are changed.

That is, smooth rotation surfaces S103a, S203a, and S303a are formed at intermediate portions of outer peripheral surfaces of the first to third sun gears S1a, S2a, and S3a, and first teeth S101a, S201a, and S301a and second teeth S102a, S202a, and S302a are formed at opposite sides of the rotation surfaces S103a, S203a, and S303a, respectively.

The first and second teeth S101a, S201a, and S301a and S102a, S202a, and S302a are engaged with teeth of the planetary gears.

That is, the first teeth S101a of the first sun gear S1a are engaged with the second planetary gears 102, and the third planetary gears 203 are engaged with the second teeth S102a.

The first teeth S201a of the second sun gear S2a are engaged with the fourth planetary gears 204, and the fifth planetary gears 305 are engaged with the second teeth S202a.

The first teeth S301a of the first sun gear S3a are engaged with the sixth planetary gears 306, and the seventh planetary gears 407 are engaged with the second teeth S302a.

Bearings Ba are coupled to central holes of cover plates 114, 224, 334, and 444 of the first to fourth pulleys 11, 22, 33, and 44, and the first to third sun gears S1a, S2a, and S3a and the first and second outer sun gears S5a and S6a are coupled to inner sides of the bearings Ba.

In particular, as surfaces of the bearings Ba are coupled to the smooth rotation surfaces S103a, S203a, and S303a and the rotation surfaces S503a and S603a, the first to third sun gears S1a, S2a, and S3a and the first and second outer sun gears S5a and S6a can be smoothly rotated.

Next, the fourth embodiment of the present invention will be described with reference to FIG. 18.

Figure 18:
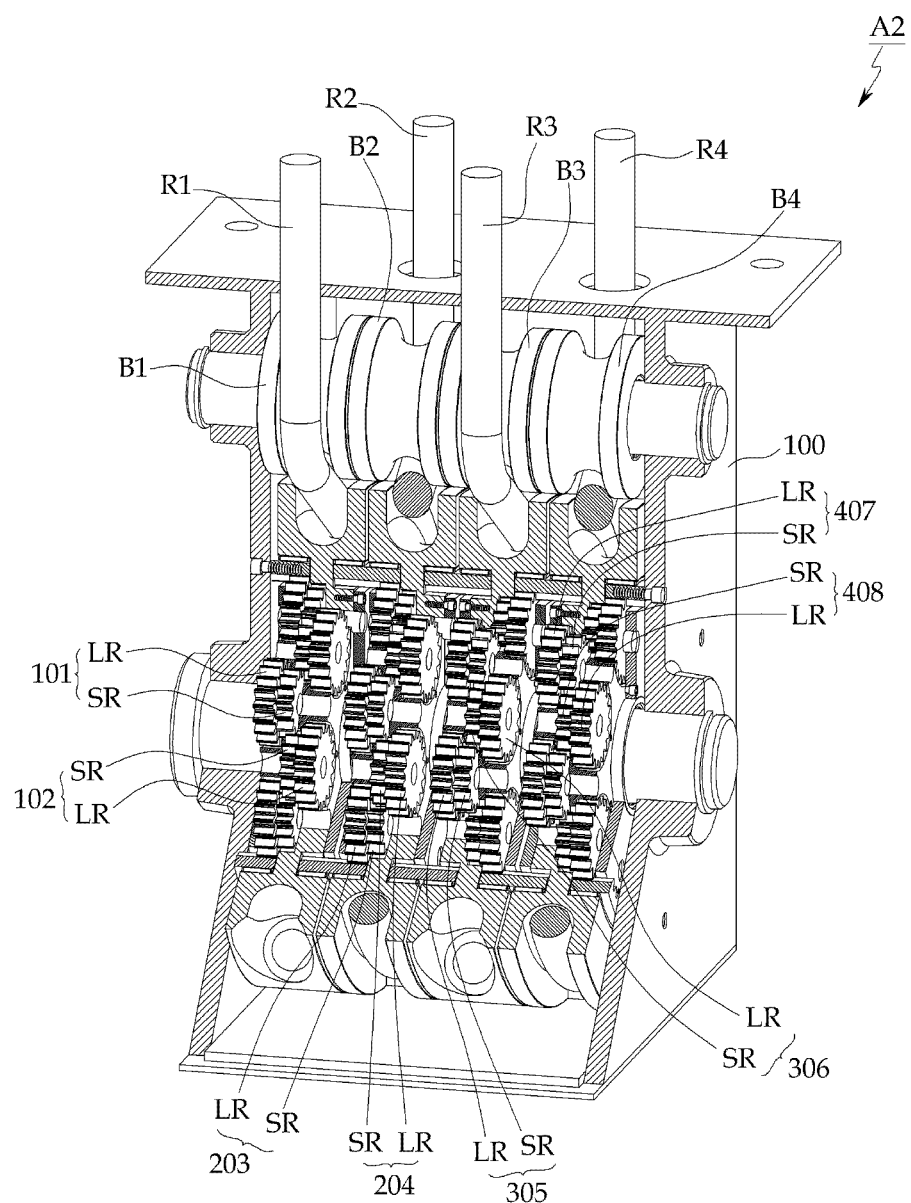
FIG. 18 is a partially sectional perspective view showing an assembled state of an apparatus for automatically equalizing tensions of elevator wire ropes according to the fourth embodiment of the present invention.

FIG. 18 is a partially sectional perspective view showing an assembled state of an apparatus for automatically equalizing tensions of elevator wire ropes according to the fourth embodiment of the present invention.

The first to eighth planetary gears 101, 102, 203, 204, 305, 306, 407, and 408 shown in the above-described first to third embodiments A1 to A3 and A1-2 and A2-2 have a spur gear shape.

However, the planetary gears are not limited to spur gears, and may be modified into a dual structure spur gear shape having different diameters as shown in FIG. 16.

As shown in FIG. 17, each of the first to eighth planetary gears 101, 102, 203, 204, 305, 306, 407, and 408 is a stepped dual spur gear in which a large gear LR having a large diameter and a small gear SR having a small diameter overlap each other.

The teeth of the first planetary gears 101 and the teeth of the second planetary gears 102 are engaged with each other by engaging the small gears SR of the first planetary gears 101 and the small gears SR of the second planetary gears 102.

Likewise, the small gears SR of the third and fourth planetary gears 203 and 204, the fifth and sixth planetary gears 305 and 306, and the seventh and eighth planetary gears 407 and 408 are also engaged with each other.

Of course, it is apparent that the large gears LR of the planetary gears forming a pair may be coupled to each other.

Thus, rotation speeds of the first to eighth planetary gears 101, 102, 203, 204, 305, 306, 407, and 408 may be changed by engaging the small gears SR thereof or the large gears LR thereof, and winding speeds of the first to fourth pulleys 11, 22, 33, and 44 can be changed by changing the rotation speeds.

Although the four wire ropes and the four rotation units coupled thereto have been described as a premise for the description of the first to fourth embodiments of the present invention, the number of wire ropes and the number of rotation units coupled thereto are not limited to four, but may be an odd or even number more than four.

Further, although in the description of the organic operations of the plurality of rotation units, the first wire rope is initially operated and the second to fourth wire ropes are operated in conjunction with the first wire rope, the initial operation order may not be fixed but may be arbitrary and the operations of the rotation units in conjunction with the wire ropes are substantially the same, and thus operation examples thereof will not be described in detail.

Figure 19:
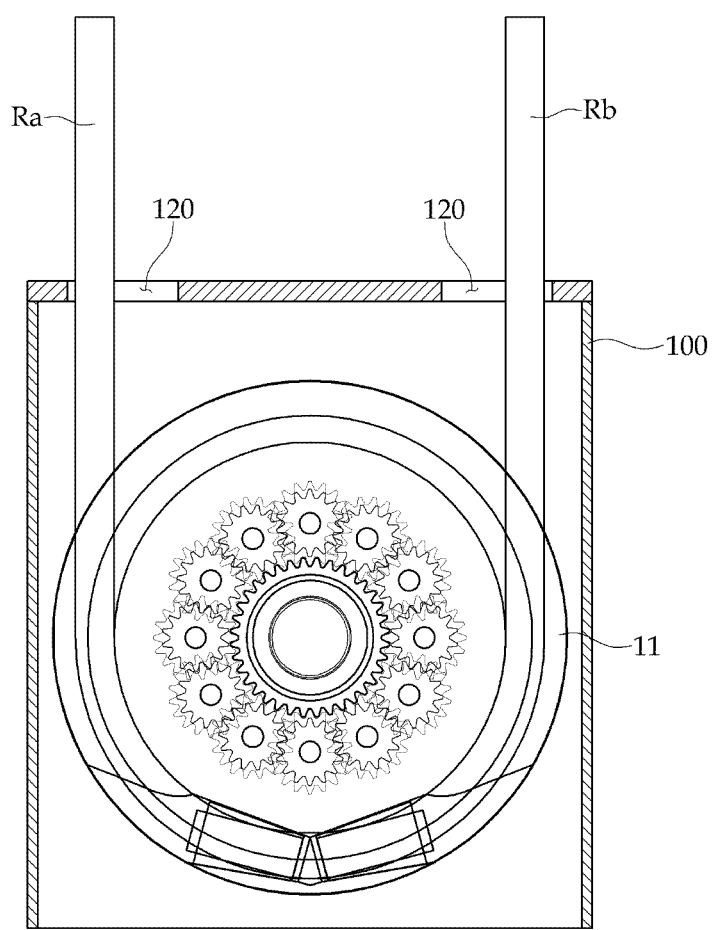
FIGS. 19 and 20 are sectional views showing an apparatus for automatically equalizing tensions of elevator wire ropes according to other embodiments of the present invention.
Figure 20:
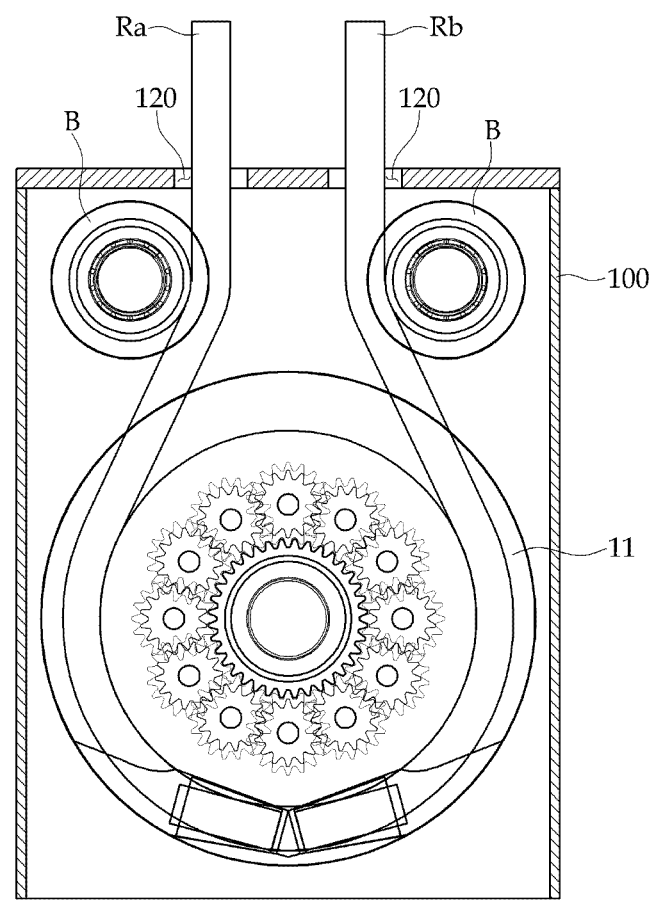

Meanwhile, FIGS. 19 and 20 are sectional views showing an apparatus for automatically equalizing tensions of elevator wire ropes according to other embodiments of the present invention.

As shown in FIG. 19, after two elevator wire ropes Ra and Rb are introduced through holes 120 formed at upper portions of the body 100 to contact an outer side of the pulley 11, ends of the wire ropes Ra and Rb are fixed to lower portions of the pulley 11, in which state there exists no guide roller.

As shown in FIG. 20, after two elevator wire ropes Ra and Rb are introduced through holes 120 formed at upper portions of the body 100 to contact an outer side of the pulley 11, ends of the wire ropes Ra and Rb are fixed to lower portions of the pulley 11, in which state guide rollers B are mounted to the elevator wire ropes Ra and Rb, respectively.

Thus, the guide rollers B may not exist or one or more guide rollers may be mounted.

It should be understood that since the exemplary embodiments described herein and the configurations shown in the drawings are only the most preferred exemplary embodiments of the present invention but do not represent the technical spirit of the present invention, various equivalents and modifications which can replace the exemplary embodiments of the present invention are present.

The invention claimed is:

1. An apparatus for automatically equalizing tensions of elevator wire ropes, the apparatus comprising:
    a body having an accommodation space therein;
    a tension adjusting unit connected to first, second, third, and fourth wire ropes and installed within the body; and
    a main shaft passing through the tension adjusting unit and coupled to an inner side of the body to be rotatable horizontally,
    wherein the tension adjusting unit comprises:
    a first rotation unit coupled to the main shaft and having an outer peripheral surface on which the first wire rope is wound;
    a second rotation unit coupled to the main shaft, having an outer peripheral surface on which the second wire rope is wound, and rotated in conjunction with the first rotation unit;
    a third rotation unit coupled to the main shaft, having an outer peripheral surface on which the third wire rope is wound, and rotated in conjunction with the second rotation unit; and
    a fourth rotation unit coupled to the main shaft, having an outer peripheral surface on which the fourth wire rope is wound, and rotated in conjunction with the third rotation unit,
    wherein the first rotation unit comprises:
    a first pulley having a peripheral member having a rope groove in which the first wire rope is wound on an outer peripheral surface thereof, and a disk formed at an inner side of the peripheral member, coupled to the main shaft, and having ring grooves on front and rear surfaces thereof, respectively, such that a first outer ring gear and a first ring gear are partially inserted thereinto;
    the first ring gear having first inner teeth on an inner peripheral surface thereof and a portion of which is inserted and coupled into an inner peripheral surface of one side of the first pulley;
    a first planetary gear unit having a plurality of first planetary gears coupled to the front surface of the disk of the first pulley, and a plurality of second planetary gears coupled to the rear surface of the disk and only half of teeth of which are engaged with the first planetary gears; and
    a first outer ring gear having inner teeth on an inner peripheral surface thereof such that the inner teeth of the first outer ring gear are engaged with teeth of the first planetary gears and coupled to the ring groove on the front surface of the disk of the first pulley, and wherein each of the first and second planetary gears is a spur gear having a predetermined thickness or a dual spur gear in which a large gear having a large diameter and a small gear having a small diameter are integrally formed; wherein the second rotation unit comprises: a second pulley having a peripheral member having a rope groove on which the second wire rope is wound on an outer peripheral surface thereof and a disk formed at an inner side of the peripheral member, coupled to the main shaft, and having ring grooves into which the first ring gear and a second ring gear are partially inserted on front and rear surfaces thereof; the second ring gear having second inner teeth on an inner peripheral surface thereof and a portion of which is inserted and coupled into an inner peripheral surface of one side of the second pulley; and a second planetary gear unit having a plurality of third planetary gears coupled to the front surface of the disk of the second pulley and only some of teeth of which are engaged with the first inner teeth, and a plurality of fourth planetary gears coupled to the rear surface of the disk of the second pulley and the teeth of which are engaged with the third planetary gears and the second ring gear, and each of the third and fourth planetary gears is a spur gear having a predetermined thickness or a dual spur gear in which a large gear having a large diameter and a small gear having a small diameter are integrally formed.

2. The apparatus of claim 1, wherein the third rotation unit comprises:
    a third pulley having a peripheral member having a rope groove on which the third wire rope is wound on an outer peripheral surface thereof and a disk formed at an inner side of the peripheral member, coupled to the main shaft, and having ring grooves into which the second ring gear and a third ring gear are partially inserted on front and rear surfaces thereof;
    the third ring gear having third inner teeth on an inner peripheral surface thereof and only a portion of which is inserted and coupled into an inner peripheral surface of one side of the third pulley; and
    a third planetary gear unit having a plurality of fifth planetary gears coupled to the front surface of the disk of the third pulley and only some of teeth of which are engaged with the second inner teeth, and a plurality of sixth planetary gears coupled to the rear surface of the disk of the third pulley and the teeth of which are engaged with the fifth planetary gears and the third ring gear, and
    wherein each of the fifth and sixth planetary gears is a spur gear having a predetermined thickness or a dual spur gear in which a large gear having a large diameter and a small gear having a small diameter are integrally formed.

3. The apparatus of claim 2, wherein the fourth rotation unit comprises:
    a fourth pulley having a peripheral member having a rope groove on which the fourth wire rope is wound on an outer peripheral surface thereof and a disk formed at an inner side of the peripheral member, coupled to the main shaft, and having ring grooves into which the third ring gear and the second outer ring gear are partially inserted on front and rear surfaces thereof;
    a fourth planetary gear unit having a plurality of seventh planetary gears coupled to the front surface of the disk of the fourth pulley and only some of teeth of which are engaged with the third inner teeth of the third ring gear, and a plurality of eighth planetary gears coupled to the rear surface of the disk of the fourth pulley and only some of teeth of which are engaged with the seventh planetary gears; and a second outer ring gear having inner teeth on an inner peripheral surface thereof such that the inner teeth of the second outer ring gear are engaged with the remaining teeth of the eighth planetary gears and coupled to the ring groove on the rear surface of the disk of the fourth pulley, and wherein each of the seventh and eighth planetary gears is a spur gear having a predetermined thickness or a dual spur gear in which a large gear having a large diameter and a small gear having a small diameter are integrally formed.

4. The apparatus of claim 3, wherein the second outer ring gear is coupled to the body or the main shaft.

5. The apparatus of claim 1, wherein fixing holes are formed at portions of the rope grooves such that ends of the first, second, third and fourth wire rope are fixed thereto, and catching members are formed at ends of the first, second, third and fourth wire ropes such that the catching members are caught by the fixing holes.

6. The apparatus of claim 5, wherein each of the fixing holes is tapered such that an entry thereof has a large diameter and an exit thereof has a small diameter, and the catching member is tapered to be coupled to the fixing hole.

7. The apparatus of claim 1, wherein the first and second wire ropes are wound inversely to each other and the third and fourth wire ropes are wound inversely to each other.

8. The apparatus of claim 1, wherein the first outer ring gear is coupled to the body or the main shaft.

9. The apparatus of claim 1, further comprising:

first, second, third and fourth guide rollers rotatably coupled to an interior of the body such that the first, second, third and fourth wire ropes are respectively connected to the tension adjusting unit contact outer sides of the first, second, third and fourth guide rollers.

* * * * *